(12) United States Patent
Piri et al.

(10) Patent No.: US 10,144,864 B1
(45) Date of Patent: Dec. 4, 2018

(54) METHODS FOR DETERMINING AN OPTIMAL SURFACTANT STRUCTURE FOR OIL RECOVERY

(71) Applicant: University of Wyoming, Laramie, WY (US)

(72) Inventors: Mohammad Piri, Laramie, WY (US); Lamia Goual, Laramie, WY (US); Vahideh Mirchi, Laramie, WY (US); Morteza Akbarabadi, Laramie, WY (US); Soheil Saraji, Laramie, WY (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 15/590,643

(22) Filed: May 9, 2017

(51) Int. Cl.
| | |
|---|---|
| *E21B 43/16* | (2006.01) |
| *C09K 8/584* | (2006.01) |
| *C09K 8/592* | (2006.01) |
| *C09K 8/60* | (2006.01) |
| *C09K 8/04* | (2006.01) |
| *C09K 8/18* | (2006.01) |

(52) U.S. Cl.
CPC ............. *C09K 8/584* (2013.01); *C09K 8/04* (2013.01); *C09K 8/18* (2013.01); *C09K 8/592* (2013.01); *C09K 8/602* (2013.01)

(58) Field of Classification Search
CPC ................ E21B 43/16; C09K 8/584
See application file for complete search history.

(56) References Cited

U.S. PATENT DOCUMENTS

2013/0067999 A1  3/2013  Xu et al.
2016/0024372 A1*  1/2016  Fathi Najafabadi ..... C09K 8/58
                                                                  166/250.02

OTHER PUBLICATIONS

Bera, A et al., "Synergistic Effect of Surfactant and Salt Mixture on Interfacial Tension Reduction between Crude Oil and Water in Enhanced Oil Recovery", Journal of Chemical & Engineering Data, 2013, pp. 89-96, American Chemical Society.
Bera, A. et al., "Interfacial tension and phase behavior of surfactant-brine-oil system", Colloids and Surfaces A: Physiochemistry Engineering Aspects, 2011, vol. 383, pp. 114-119, Elsevier.
AEO2013 Early Release Review, U.S. Energy Information Administration, Annual Energy Outlook 2013 Early Release Overview, pp. 1-16.
Seethepalli, A. et al., "Wettability Alternation During Surfactant Flooding of Carbonate Reservoirs", Society of Petroleum Engineers, Inc., 2004, pp. 1-10.
Zelenev, Andrei S. et al., "Surface Energy of North American Shales and its role in Interaction of Shale with Surfactants and Microemulsions", Society of Petroleum Engineers, 2011, pp. 1-7.
(Continued)

*Primary Examiner* — Catherine Loikith
(74) *Attorney, Agent, or Firm* — Crowell & Moring LLP

(57) ABSTRACT

Methods for determining an optimal surfactant structure for oil recovery are described. These methods systematically evaluate surfactants' phase behavior at ambient and at reservoir conditions; cloud point from ambient to reservoir conditions; dynamic interfacial tension at ambient and at reservoir conditions, including crude oil bubble images and fitting drop profiles; static contact angles at ambient conditions and dynamic contact angles at reservoir conditions; spontaneous imbibition at ambient conditions; and forced imbibition at reservoir conditions.

19 Claims, 21 Drawing Sheets

(56) References Cited

OTHER PUBLICATIONS

Zelenev, Andrei S. et al., "Investigation of interactions of diluted microemulsions with shale rock and sand by adsorption and wettability measurements", Colloids and Surfaces A: Physiochemistry Engineering Aspects, 2011, vol. 391, pp. 201-207, Elsevier.
Clark, Corrie et al., "Hydraulic Fracturing and Shale Gas Production: Technology, Impacts, and Policy", Argonne National Laboratory, 2012, pp. 1-16.
Eas Toe, Julian, Advanced Surfactants and Interfaces, 2003, pp. 1-2.
Rosen, M. J.et al., Surfactants and Interfacial Phenomena, Wiley & Sons, Inc, 2004, pp. 1-444.
Johnston, David H., "Physical Properties of Shale at Temperature and Pressure", Geophysics, vol. 52, No. 10, 1987, pp. 1391-1401, Society of Exploration Geophysicists.
Nguyen, Duy et al., "Evaluation of Surfactants for Oil Recovery Potential in Shale Reservoirs", Society of Petroleum Engineers, 2014, pp. 1-12.
Kelland, Malcolm A., "Production Chemicals for the Oil and Gas Industry", Taylor and Francis Group, LLC, 2009, pp. 1-411, CRC Press.
Scechter, D.S. et al., "Capillary Imbibition and Gravity Segregation in Low IFT Systems", Society of Petroleum Engineers Inc., 1991, pp. 71-81.
Curbelo, F. et al., "Salinity Effect in Cloud Point Phenomena by Nonionic Surfactants Used in Enhanced Oil Recovery Tests", Petroleum Science and Technology, 2013, vol. 31, No. 15, pp. 1544-1552, Taylor & Francis Group.
Van Voorst Vader, F., "Adsorption of Detergents at the Liquid-Liquid Interface", Unilever Research Laboratory, 1959, pp. 1067-1077.
Jerauld, G.R. et al., "The Effect of Pore-Structure on Hysteresis in Relative Permeability and Capillary Pressure: Pore-Level Modeling", Transport in Porous Media, vol. 5, 1990, pp. 103-151, Kluwer Academic Publishers.
Rosano, H.L. et al., "Considerations on Formation and Stability of Oil/Water Disperesed Systems", Journal of the American Oil Chemists Society, vol. 59, No. 8, 1982, pp. 360-363.
Schott, Hans, "Hydration of Micellar nonionic Detergents", Journal of Colloid and Interface Science, vol. 24, 1967, pp. 193-198.
Morrow, N.R. et al., "Effect of Viscous and Buoyancy Forces on Nonwetting Phase trapping in Porour Media", Petroleum Recovery Research Center, Surface Phenomena in Enhanced Oil Recovery, 1981, pp. 387-411.
Makhanov, K. et al., "An Experimental Study of Spontaneous Imbibition in Horn River Shales", Society of Petroleum Engineers, 2012, pp. 1-14.
Shinoda, K. et al., "The Effect of the Size and Distribution of the Oxyethylene Chain Lengths of Nonionic Emulsifiers on the Stability of Emulsions", Yokohama National University, Journal of Colloid and Interface Science, vol. 35, No. 4, 1971, pp. 624-630.
Shinoda, K., "The Corrleation between the Dissolution State of Nonionic Sufactant and the Type of Dispersion Stabilized with the Surfactant", Yokahama National University, Jounral of Colloid and Interface Science, vol. 24, 1967, pp. 4-9.
Shah, D.O. et al., "Improved Oil Recovery by Surfactant and Polymer Flooding", Academic Press, Inc., 1977, pp. 1-578.
Akbarabadi, M. et al., "Nano-scale experimental investigation of In-situ wettability and spontaneous imbibition in ultra-tight reservoir rocks", Advances in Water Resources, vol. 107, 2017, pp. 160-179, Elsevier.

Annual Energy Outlook 2012 with Projections in 2015, U.S. Energy Information Administration, Annual Energy Outlook 2012, pp. 1-239.
Krawczyk, M.A. et al., "Chemical Demulsification of Petroleum Emulsions Using Oil-Soluble Demulsifiers", American Chemical Society, vol. 30, 1991, pp. 367-375.
Zou, Caineng et al., "Unconventional Petroleum Geology", Petroleum Industry Press, 2013, pp. 1-372 Elsevier.
Tadros, Tharwat F., "Applied Surfactants: Principles and Applications", Wiley-VCH Verlag GmbH & Co KGaA, Chapter 2, pp. 19-39.
Tadros, Tharwat F., "Applied Surfactants: Principles and Applications", Wiley-VCH Verlag GmbH & Co KGaA, Chapter 10, pp. 309-333.
Khishvand, Mandi et al., "Micro-scale experimental investigation of the effect of flow rate on trapping in sandstone and carbonate rock samples", Advances in Water Resources, vol. 94, 2016, pp. 379-399, Elsevier.
Schick, Martin J., "Nonionic Surfactants: Phsycial Chemistry", Marcel Dekker, Inc., 1987, pp. 297-325.
Berger, P.D. et al., "Designing and Selecting Demulsifiers for Optimum Field Performance on the Basis of Production Fluid Characteristics", Society of Petroleum Engineers, 1988, pp. 522-526.
Kokal, Sunil, "Crude-Oil Emulsions: A State-Of-The-Art Review", Society of Petroleum Engineers, 2005, pp. 5-13, SPE Production & Facilities.
Saraji, Soheil et al., "The representative sample size in shale oil rocks and nano-scale characterization of transport properties", International Journal of Coal Geology, vol. 146, 2015, pp. 42-54, Elsevier.
Rosen, M.J. et al., "Dynamic Surface tension of Aqueous Surfactant Solutions", Journal of Colloid and Interface Science, vol. 179, 1996, pp. 261-268.
Attwood, D. et al., "Surfactant Systems: Their Cehmistry, Pharmacy and Biology", Chapman and Hall Ltd, 1983, pp. 1-39.
Inoue, Tohru et al., "Cloud point phenomena for POE-type nonionic surfactants in a model room temperature ionic liquid", Journal of Colloid and Interface Science, vol. 326, 2008, pp. 483-489, Elsevier.
Jones, T.J. et al., "Water-in-Crude Oil Emulsion Stability and Emulsion Destabilization by Chemical Demulsifiers", The Journal of Canadian Petroleum Technology, pp. 100-108, 1978, Petroleum Society of Canada.
Mitsui, T. et al., "Changes in the Interfacial Tension with Temperature and Their Effects on the Particle Size and Stability of Emulsions", Kolloid-Zeitschrift and Zertschrift fur Polyemere vol. 250, 1972, pp. 227-230.
Mirchi, Vahideh et al., "Dynamic interfacial tension and wettability of shale in the presence of surfactants at reservoir conditions", Fuel, vol. 148, 2015, pp. 127-138.
Hua, Xi Yuan et al., "Dynamic Surface Tension of Aqueous Surfactant Solutions", Journal of Colloid and Interface Science, vol. 124, No. 2, 1988, pp. 652-659.
Tanino, Y. et al., "Capillary Trapping in Sandstones and Carobnates" Dependence on Pore Structure, Water Resources Research, vol. 48, No. 8, 2012, pp. 1-24.
Yang, Y. et al., "Lab and Field Study of New Microemulsion-Based Crude Oil Demulsifier for Well Completions", Society of Petroleum Engineers, 2009, pp. 1-14.
Gao, T. et al., "Dynamic Surface Tension of Aqueous Surfactant Solutions: 7. Physical Significance of Dynamic Parameters and the Induction Period," J. Colloid & Interface Sci. 1995, 172, 242-248.

\* cited by examiner

METHODS FOR DETERMINING AN OPTIMAL SURFACTANT STRUCTURE FOR OIL RECOVERY

FIELD OF THE INVENTION

The present invention relates to methods for evaluating an optimal surfactant structure for oil recovery through a systematic evaluation of surfactants' phase behavior, cloud point, dynamic interfacial tension, dynamic contact angle, spontaneous imbibition, and forced imbibition.

BACKGROUND OF THE INVENTION

The United States' projected annual energy growth from 2010 through 2035 is 0.3%, from which 37% will be produced from petroleum resources (Annual Energy Outlook, U.S. Energy Information Administration, Technical Report, 2012). Chemical flooding, an enhanced oil recovery (EOR) method, has been used to improve oil production from conventional reservoirs (D. O. Shah, and R. S. Schechter, Improved oil recovery by surfactant and polymer flooding, Academic press, Inc., New York, 1977). Surfactants have been used as EOR agents to decrease interfacial tension (IFT) between oil and brine, leading to an increase in surface area of the oil droplets (smaller droplets) and higher oil production (J. Eastoe, Advanced surfactants and interfaces, Bristol UK, 2003).

Oil production from ultra-tight reservoirs is rapidly growing and will dominate in the next 10-15 years in the United States (AEO 2013 Early Release Overview, U.S. Energy Information Administration, Technical Report, 2013). However, ultra-tight reservoirs have a complicated mineralogy including clay minerals and clastic minerals like quartz, feldspar, and calcite. Moreover, ultra-tight reservoir rocks have interstitial pore sizes ranging from 1-3 nm to 400-750 nm (C. Zou, Unconventional Petroleum Geology, Newnes, 2013). The small interstitial pore sizes lead to high capillary pressures, which act as a barrier to fluid mobility in ultra-tight reservoirs. Horizontal drilling and hydraulic fracturing processes to enhance the reservoir permeability overcome the barrier only partially.

In hydraulic fracturing, reservoir rock is cracked by pumping fluids into the wellbore and rock formation. Fracturing fluids comprise municipal water, proppant, and chemical additives such as surfactants (C. Clarck, A. Burnham, C. Harto, and R. Homer, Hydraulic fracturing and shale gas production: Technology, Impacts, and Regulations, Argonne National Laboratory, Technical Report, 2013). Surfactants are often added to fracturing fluids to enhance their imbibition into reservoir rock.

Safety concerns have forced a shift toward environmentally friendly surfactants, such as polyoxyethylenated (POE) straight-chain alcohols $R(OC_2H_4)_xOH$. POEs are biodegradable and, compared to other nonionic surfactants, have greater tolerance to high ionic strength and hard water conditions (M. J. Rosen and J. T. Kunjappu, Surfactants and Interfacial Phenomena, Wiley, 2012).

The behavior of POE surfactants changes as POE structures are altered. The differences in POE surfactant behavior can be measured through surface/interfacial tension (IFT), emulsification, solubilization, and turbidity of surfactant solutions (Tharwat F. Tadros, Applied Surfactants: Principles and Applications, Wiley-VCH, 2005).

The decline in IFT using surfactants enhances the dispersion of one phase in another, resulting in the formation of emulsions (S. Kokal, Crude oil emulsions: A state-of-the-art review, SPE Production & Facilities, vol. 20, no. 1, pp. 5-13, 2005). Emulsions and microemulsions may cause formation damage, particularly in tight reservoirs with low porosity and permeability. They may also cause pressure drops in flow lines and the production of off-spec crude oil (S. Kokal, Crude oil emulsions: A state-of-the-art review, SPE Production & Facilities, vol. 20, no. 1, pp. 5-13, 2005). Thus, demulsifying surfactants are used in petroleum reservoirs to avoid operational difficulties during production.

Microemulsion formation depends on a surfactant's surface activity (M. J. Rosen and J. T. Kunjappu, Surfactants and Interfacial Phenomena, Wiley, 2012). As surfactant molecules diffuse from the bulk phase to the oil/brine interface, the surfactants' hydrophobic tails adsorb on the oil phase and their hydrophilic heads partition into the aqueous (brine) phase. Interface partitioning of surfactants increases with increasing hydrophilic chain length, thus increasing the probability of microemulsion formation. For a surfactant to behave as an emulsifier, large surface activity coupled with low IFT values is generally required. This is achieved by increasing the length of the hydrophobic chain (K. Shinoda, H. Saito, H. Arai, Effect of the size and the distribution of the oxyethylene chain lengths of nonionic emulsifiers on the stability of emulsions, Journal of Colloid and Interface Science, vol. 35, no. 4, pp. 624-630, 1971). However, although lowering IFT enhances emulsion stability, ultra-low IFT can destabilize the emulsions (P. D. Berger, C. Hsu, and J. P. Arendell, Designing and selecting demulsifiers for optimum field performance on the basis of production fluid characteristics, SPE Production Engineering, vol. 3, no. 4, pp. 522-526, 1988; H. L. Rosano and D. Jon, Considerations on formation and stability of oil/water dispersed systems, Journal of the American Oil Chemists' Society, vol. 59, no. 8, 1982; and Y. Yang, K. I. Dismuke and G. S. Penny, Lab and field study of microemulsion-based crude oil demulsifier for well completions, SPE International Symposium on Oilfield Chemistry, Texas, USA, April 2009).

Demulsifying efficiency has been shown to result from equal partitioning of surfactants between oil and brine phases (M. A. Kelland, Production chemicals for the oil and gas industry, CRS Press, 2009; M. A. Krawczyk, D. T. Wasan, and C. S. Shetty, Chemical demulsification of petroleum emulsions using oil-soluble demulsifiers, Industrial & Engineering Chemistry Research, vol. 30, no. 2, pp. 367-375, 1991; P. D. Berger, C. Hsu, and J. P. Arendell, Designing and selecting demulsifiers for optimum field performance on the basis of production fluid characteristics, SPE Production Engineering, vol. 3, no. 4, pp. 522-526, 1988). However, weak emulsifiers that are also IFT reducers may also be beneficial to oil recovery (L. Xu, Q. Fu, Methods for selection of surfactants in well stimulation, US 2013/0067999 A1, 2013). Therefore, to generate less emulsion and high oil recovery in a surfactant/rock/oil/brine system, it may be desirable to use surfactants with none or weak emulsifying ability and low IFT (L. Xu, Q. Fu, Methods for selection of surfactants in well stimulation, US 2013/0067999 A1, 2013).

Surfactant solubility indicates a surfactant's ability to remain active in brine and to travel into the rock matrix at reservoir temperature. Further, surfactant solubility in aqueous solution may directly impact oil recovery. The solubility of an aqueous nonionic surfactant solution depends on temperature and is manifested by a cloud point temperature (CPT).

CPT greatly depends on the arrangement of hydrophobic and hydrophilic parts of surfactants. Cloud point studies of several polyoxyethylene (POE)-type nonionic surfactant solutions in 1-butyl-3-methylimidazolium tetrafluoroborate suggest that CPT increases with increasing POE chain length and decreases with increasing hydrocarbon chain length (T. Inoue and T. Misono, Cloud point phenomena for POE-type nonionic surfactants in a model room temperature ionic liquid, Journal of Colloid and Interface science, vol. 326, no. 2, pp. 483-489, 2008).

The impact of surfactants on parameters like surface/interfacial tension, contact angle, solubility, and emulsification have been performed at ambient conditions for applications in oil recovery from conventional and tight reservoirs (K. Makhanov and H. Dehghanpour, An experimental study of spontaneous imbibition in Horn River shales, SPE Canadian Unconventional Resources Conference, Calgary, Alberta, Canada, 2012; A. Bera, K. Ojha, A. Mandal, and T. Kumar, Interfacial tension and phase behavior of surfactant-brine-oil system, Colloids and Surfaces A, vol. 383, pp. 114-119, 2011; A. Bera, A. Mandal, and B. B. Guha, Synergistic Effect of Surfactant and Salt Mixture on Interfacial Tension Reduction between Crude Oil and Water in Enhanced Oil Recovery, Journal of Chemical Engineering Data, vol. 59, no. 1, pp. 89-96, 2013; A. Seethepalli, B. Adibhatla, K. K. Mohanty, Wettability alteration during surfactant flooding of carbonate reservoirs, Journal of Chemical Engineering Data, SPE/DOE Symposium on Improved Oil Recovery, Tulsa, Okla., April, 2004; A. S. Zelenev, CESI Chemical, a Flotek Industries Company, Surface energy of North American Shales and its role in interaction of shale with surfactants and microemulsions, SPE International Symposium on Oilfield Chemistry, Texas, USA, 2011; A. S. Zelenev, L. M. Champagne, M. Hamilton, Investigation of interactions of diluted microemulsions with shale rock and sand by adsorption and wettability measurements, Colloids and Surfaces A, vol. 391, no. 1-3, pp. 201-207, 2011). However, these parameters have rarely been examined at reservoir conditions.

Further, although the adsorption of surfactants at liquid/liquid or liquid/solid interfaces is a dynamic process, surface/interfacial tension, contact angle, solubility, and emulsification have been primarily studied at equilibrium conditions (D. Nguyen, D. Wang, A. Oladapo, J. Zhang, J. Sickorez, R. Butler, and B. Mueller, Evaluation of Surfactants for Oil Recovery Potential in Shale Reservoirs, SPE Improved Oil Recovery Symposium, Tulsa, Okla., USA, April 2014). In addition, very limited comprehensive studies exist to systematically screen surfactant structure for enhanced oil recovery, particularly for tight reservoirs.

SUMMARY OF THE INVENTION

The invention provides a method for determining an optimal surfactant structure for oil recovery, comprising evaluating a surfactant's phase behavior, cloud point, dynamic interfacial tension, static and dynamic contact angles, spontaneous imbibition, and forced imbibition experiments in a porous rock sample.

DETAILED DESCRIPTION

Figure 1A:
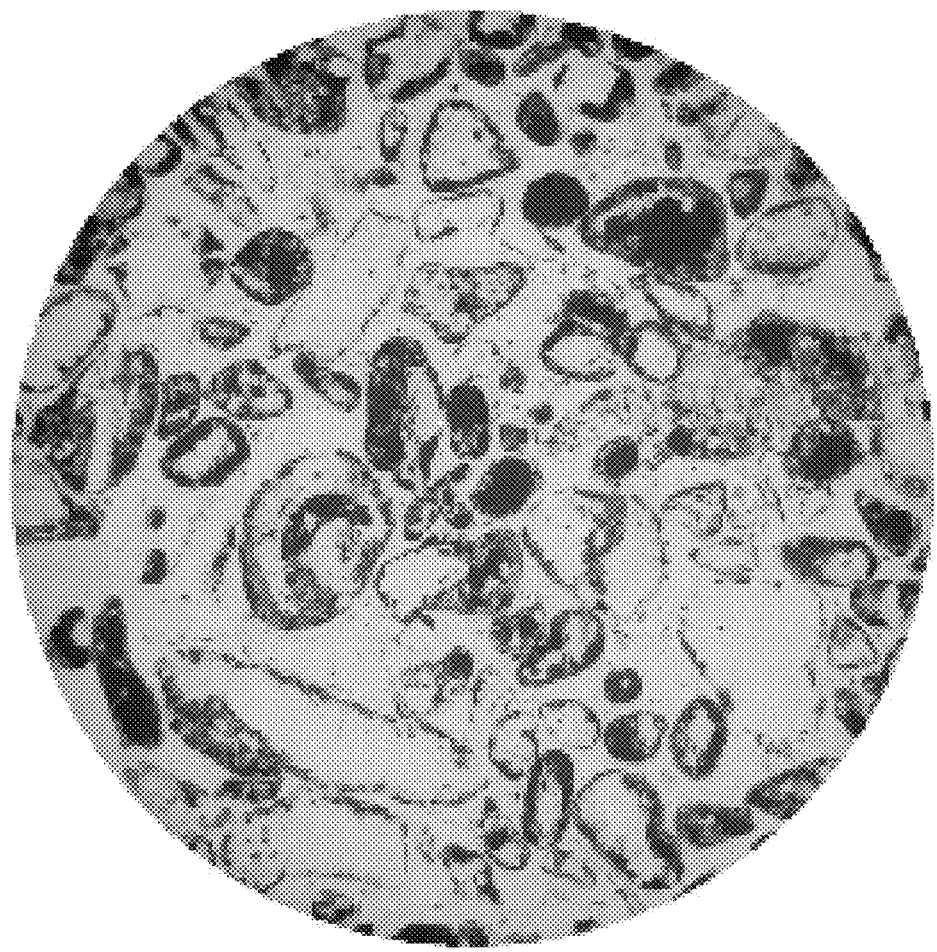
FIG. 1A. Two-dimensional visualization of pore space of Edwards limestone. Diameter=2 mm, resolution=1.0 µm.

The following description and examples are set forth to illustrate the invention and are not meant to be limiting. Since modifications of the described embodiments incorporating the spirit and the substance of the invention may occur to persons skilled in the art, the invention should be construed to include all variations within the scope of the claims and equivalents thereof.

The invention provides a method for determining an optimal surfactant structure for oil recovery, comprising the steps of: (a) evaluating a surfactant's phase behavior; (b) evaluating the surfactant's solubility; (c) evaluating the surfactant's dynamic interfacial tension in a porous rock sample; (d) evaluating the surfactant's static and dynamic contact angles in the porous rock sample; (e) evaluating the surfactant's spontaneous imbibition in the porous rock sample; and (f) evaluating the surfactant's forced imbibition in the porous rock sample.

A further embodiment of the invention is a method for determining an optimal surfactant structure for oil recovery, wherein the method is carried out with a surfactant concentration above the critical micelle concentration.

A further embodiment of the invention is a method for determining an optimal surfactant structure for oil recovery, wherein the method is carried out at a surfactant concentration of 0.1% wt.

A further embodiment of the invention is a method for determining an optimal surfactant structure for oil recovery, wherein the method is carried out in unconventional reservoir rock.

A further embodiment of the invention is a method for determining an optimal surfactant structure for oil recovery, wherein the method is carried out in limestone.

A further embodiment of the invention is a method for determining an optimal surfactant structure for oil recovery, wherein the method is carried out in sandstone.

A further embodiment of the invention is a method for determining an optimal surfactant structure for oil recovery, wherein the surfactant's phase behavior is evaluated by visualizing a microemulsion middle phase at ambient and high temperatures.

A further embodiment of the invention is a method for determining an optimal surfactant structure for oil recovery, wherein the surfactant's solubility is evaluated by determining the surfactant's cloud point temperature at ambient conditions and at reservoir conditions.

A further embodiment of the invention is a method for determining an optimal surfactant structure for oil recovery, wherein the surfactant's dynamic interfacial tension is evaluated at ambient conditions and at reservoir conditions.

A further embodiment of the invention is a method for determining an optimal surfactant structure for oil recovery, wherein the surfactant's dynamic interfacial tension is evaluated by (i) creating a bubble of crude oil inside a measurement cell; (ii) capturing oil bubble images; and (iii) fitting drop profiles to the Young-Laplace equation.

A further embodiment of the invention is a method for determining an optimal surfactant structure for oil recovery, wherein oil bubble images are captured at time intervals ranging from 1 second to 100 seconds.

A further embodiment of the invention is a method for determining an optimal surfactant structure for oil recovery, wherein oil bubble images are captured at time intervals ranging from 1 second to 10 seconds.

A further embodiment of the invention is a method for determining an optimal surfactant structure for oil recovery, wherein oil bubble images are captured at time intervals of 5 seconds.

A further embodiment of the invention is a method for determining an optimal surfactant structure for oil recovery, wherein the surfactant's static and dynamic contact angles are evaluated at ambient conditions and at reservoir conditions.

A further embodiment of the invention is a method for determining an optimal surfactant structure for oil recovery, wherein the surfactant's static contact angle is evaluated by (i) vacuum saturating a rock sample with crude oil; (ii) immersing the saturated rock sample in brine solution; (iii) capturing oil bubble images; and (iv) measuring the angles made by a tangent line on the oil bubble images through the brine solution.

A further embodiment of the invention is a method for determining an optimal surfactant structure for oil recovery, wherein the surfactant's dynamic contact angle is evaluated by (i) creating bubbles of crude oil inside a measurement cell; (ii) capturing oil bubble images as oil bubbles were injected or retracted beneath a rock sample surface; and (iii) measuring the angles made by a tangent line on the oil bubble images through the brine solution using imaging software.

A further embodiment of the invention is a method for determining an optimal surfactant structure for oil recovery, wherein the surfactant's spontaneous imbibition is evaluated at ambient conditions.

A further embodiment of the invention is a method for determining an optimal surfactant structure for oil recovery, wherein the surfactant's spontaneous imbibition is further evaluated by (i) saturating a rock sample in crude oil; (ii) exposing the saturated rock sample to brine solution; and (iii) measuring oil production resulting from brine imbibition.

A further embodiment of the invention is a method for determining an optimal surfactant structure for oil recovery, wherein the forced imbibition is evaluated by (i) saturating a rock sample with brine solution; (ii) subjecting the rock sample to primary drainage; (iii) subjecting the rock sample to imbibition; and (iv) subjecting the rock sample to secondary drainage.

A further embodiment of the invention is a method for determining an optimal surfactant for oil recovery, wherein brine permeability and average porosity are determined after saturating the rock sample with brine solution.

A further embodiment of the invention is a method for determining an optimal surfactant structure for oil recovery, wherein subjecting the rock sample to primary drainage comprises injecting oil into the rock sample after saturating the rock sample with brine solution.

A further embodiment of the invention is a method for determining an optimal surfactant structure for oil recovery, wherein initial water saturation is determined after the primary drainage step.

A further embodiment of the invention is a method for determining an optimal surfactant structure for oil recovery, wherein subjecting the rock sample to imbibition comprises injecting a surfactant solution at a constant flow rate after the primary drainage step.

A further embodiment of the invention is a method for determining an optimal surfactant structure for oil recovery, wherein the flow rate of surfactant solution injection in the imbibition step is in the range from 0.001 cc/min to 5 cc/min.

A further embodiment of the invention is a method for determining an optimal surfactant structure for oil recovery, wherein the flow rate of surfactant solution injection in the imbibition step is in the range from 0.01 cc/min to 1 cc/min.

A further embodiment of the invention is a method for determining an optimal surfactant structure for oil recovery, wherein the flow rate of surfactant solution injection in the imbibition step is 0.1 cc/min.

A further embodiment of the invention is a method for determining an optimal surfactant structure for oil recovery, wherein residual oil saturation is determined after the imbibition step.

A further embodiment of the invention is a method for determining an optimal surfactant structure for oil recovery, wherein subjecting the rock sample to secondary drainage comprises injecting oil into the sample after the imbibition step.

Although the adsorption of surfactants at liquid/liquid or liquid/solid interfaces is a dynamic process, surface/interfacial tension, contact angle, solubility, and emulsification have been studied at equilibrium conditions and no comprehensive studies have been carried out to systematically screen surfactant structure for enhanced oil recovery, particularly for tight reservoirs. Because the physical characteristics of surfactant molecules and the properties of rock reservoirs vary with changing temperature and pressure conditions of the system (D. H. Johnston, Physical properties of shale at temperature and pressure, Geophysics Journal, vol. 52, no. 10, pp. 1391-1401, 1987), a better understanding of fluid/fluid and rock/fluid interactions at reservoir conditions is essential for the optimization of surfactant formulations.

The invention provides a new method to evaluate the optimum surfactant structure for oil recovery through a systematic evaluation of phase behavior, cloud point, dynamic interfacial tension, dynamic contact angle, spontaneous imbibition, and forced imbibition. Using this new method, a surfactant structure was identified that is superior to a nonionic surfactants commercially deployed in major unconventional oil reservoirs.

In the invention, surfactants of formula I were first assessed through emulsification and solubilization tests at ambient and reservoir temperatures. Thereafter, dynamic interfacial tensions and contact angles of crude oil and different surfactant solutions were measured at ambient and reservoir conditions. These dynamic interfacial tensions and contact angles were then used to develop correlations between the interfacial parameters and the structure of surfactants. Subsequently, spontaneous imbibition and forced imbibition tests were performed in low permeability limestone and sandstone samples to study the effect of selected surfactant structures on oil recovery from porous rocks. These limestone and sandstone samples were selected as analogs of dolomitic siltstone reservoir rock samples to investigate the influence of mineralogy and pore structure on oil recovery. The study was then extended to rock samples obtained from an unconventional oil reservoir. Spontaneous imbibition tests were performed and the results were then compared to those of a base nonionic surfactant formerly deployed in the unconventional oil reservoir. As a result, a relationship between the structure of the surfactants and oil recovery from limestone, sandstone, and reservoir samples was identified. Lastly, the performance of short-listed surfactants was verified through forced imbibition tests at actual reservoir conditions. The results were then compared to those of the base surfactant.

Definitions

As used herein, the following terms have the following meanings. If not defined, a term will have its accepted meaning in the scientific community.

The term "surfactant" refers to a surface-active agent that can adsorb onto surfaces or can interface and reduce interfacial free energies of those surfaces, thereby lowering the interfacial tension between a liquid and gas or between two liquids. A surfactant is an amphiphilic organic compound, meaning an organic compound comprising both a hydrophobic tail and a hydrophilic head. Because surfactants consist of both oil-soluble and water-soluble components, they may act as detergents, wetting agents, emulsifiers, foaming agents, and dispersants.

The term "base surfactant" refers to a commercially available surfactant structure that has been used in major unconventional oil reservoirs. The base surfactant's performance was compared to the performance of surfactants used in the invention.

The term "hydrophilic" refers to a tendency to mix with, dissolve in, or be wetted by water. Hydrophilic molecules tend to be polar and compounds (e.g., surfactants) with a hydrophilic portion tend to be polar at that portion. A surfactant's hydrophilic portion (e.g., a hydrophilic head) has an affinity for water.

The term "hydrophobic" refers to a tendency to repel water. Hydrophobic molecules tend to be non-polar and compounds (e.g., surfactants) with a hydrophobic portion tend to be non-polar at that portion. A surfactant's hydrophobic portion (e.g., a hydrophobic tail) does not have affinity for water.

The term "interfacial tension" (IFT), which may be used interchangeably with the term "surface tension," refers to a force that holds a phase's surface together.

The term "static interfacial tension" refers to an IFT value in thermodynamic equilibrium independent of time.

The term "dynamic interfacial tension" corresponds to an IFT value that changes as a function of time. For liquids with surface-active substances (surfactants), the dynamic IFT value can differ from the static IFT value.

The term "contact angle" (CA) refers to an angle where a liquid/gas or liquid/liquid interface meets a solid surface. CA values from about 0° to about 90° indicate that a solid surface (e.g., a rock) is water wet. CA values from about 90° to about 180° indicate that a solid surface is oil wet.

"Static contact angles" are measured when a droplet is standing on a solid surface (e.g., rock) and a three-phase boundary (e.g., oil/brine/rock) is not moving. "Dynamic contact angles" are measured when the droplet is standing on the solid surface and the three-phase boundary is moving. Dynamic contact angles are referred to as "advancing" when a wetting phase is displacing a non-wetting phase and are referred to as "receding" when a non-wetting phase is displacing a wetting phase.

The term "wetting phase" refers to a phase that coats a solid surface.

The term "cloud point temperature" (CPT) refers to the temperature above which a water-soluble surfactant in aqueous solution is no longer completely soluble in the aqueous solution and precipitates as a second phase. This precipitation gives the aqueous solution a cloudy appearance.

The term "conventional oil reservoir" refers to a petroleum reservoir that can produce petroleum, at least initially, without altering permeability, viscosity, or rock properties.

The term "unconventional oil reservoir" refers to a petroleum reservoir with a permeability/viscosity ratio that requires the use of technology to alter either rock permeability or fluid viscosity to produce petroleum at a commercially competitive rate.

The term "spontaneous imbibition" refers to a process of absorbing a wetting phase into a porous medium (e.g., a rock) without the aid of pressure. Spontaneous imbibition tests are driven by capillary forces in the porous medium in the absence of applied external forces. As imbibition takes place in a core sample saturated with crude oil, the wetting phase saturation (i.e., water saturation) increases and oil is recovered.

The term "forced imbibition" refers to a process of absorbing a wetting phase into a porous medium with the aid of pressure. Forced imbibition tests include primary drainage, imbibition, and secondary drainage.

The term "ambient conditions" refers to conditions wherein the temperature is room temperature and the pressure is atmospheric pressure. Room temperature ranges between 15° C. and 30° C., preferably between 18° C. and 27° C., and most preferably between 20° C. and 25° C. Atmospheric pressure ranges between 735 mm Hg and 785 mm Hg. Preferably, atmospheric pressure is 760 mm Hg.

The term "reservoir conditions" refers to conditions wherein the temperature and pressure reflect the temperature and pressure of a target reservoir. The temperature and pressure of the target reservoir varies as a function of the reservoir's proximity to the earth's mantle and the composition of the porous medium containing the reservoir. Reservoir temperatures and pressures can be determined by methods known in the art.

The term "porous rock" refers to a rock that has pores and can absorb fluids. Examples of porous rock include sandstone and limestone.

Materials

The following materials were used to carry out tests in accordance with the invention.

Preserved reservoir rock samples were employed for contact angle measurements and spontaneous imbibition tests. These rock samples were received as preserved full cores (4 in. in diameter) and were used as received, without further cleaning or conditioning. Saraji et al. show a micrograph of the reservoir samples obtained using high-resolution scanning electron microscopy (SEM) in back-scattered electron (BSE) mode and an elemental map of the samples generated using energy dispersive spectroscopy (EDS). Using three-dimensional SEM images, the porosity was measured as about 1.5% and the organic content was characterized to be less than 1 vol % (S. Saraji, M. Piri, The representative sample size in shale oil rocks and nanoscale characterization of transport properties, International Journal of Coal Geology, vol. 146, pp. 42-54, 2015). The elemental map identified the dominant minerals of the reservoir sample as dolomite, calcite, quartz, and the clays in order of abundance. X-ray diffraction (XRD) results confirmed the order of mineralogy abundance of the reservoir sample. The preserved rock sample was identified as dolomitic siltstone.

Figure 1B:
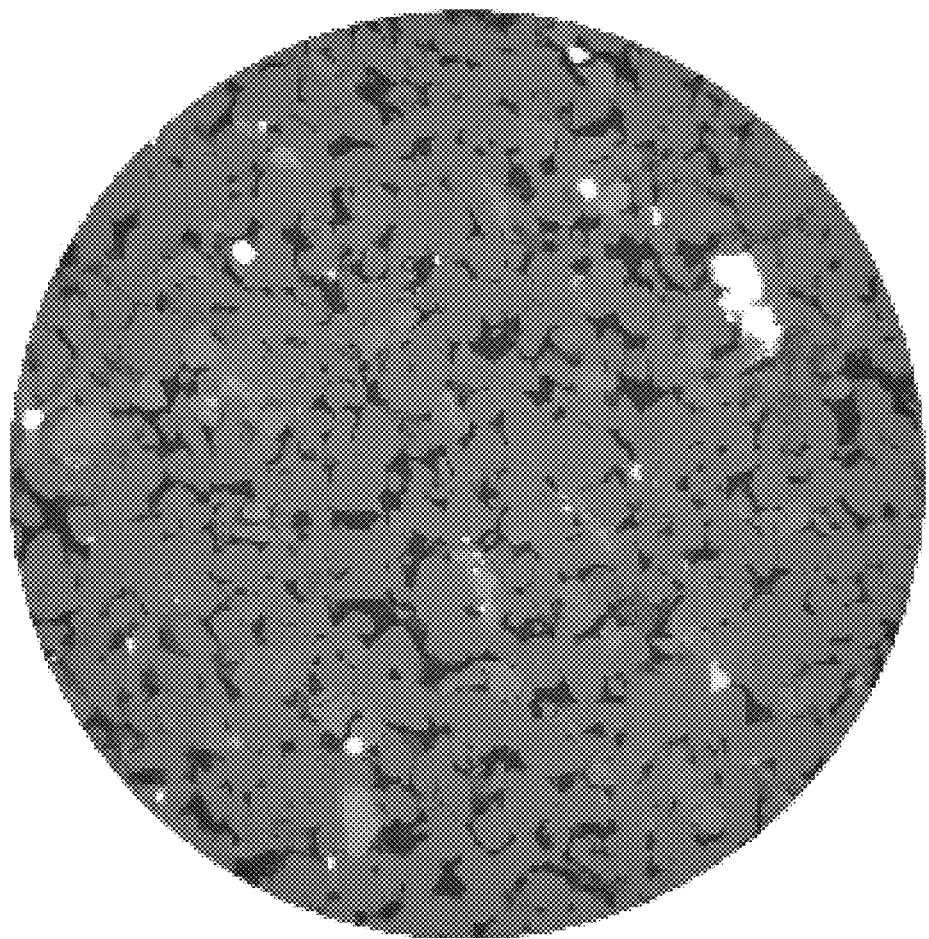
FIG. 1B. Two-dimensional visualization of pore space of Berea sandstone rock samples. Diameter=3 mm, resolution=1.5 µm.
Figure 1C:
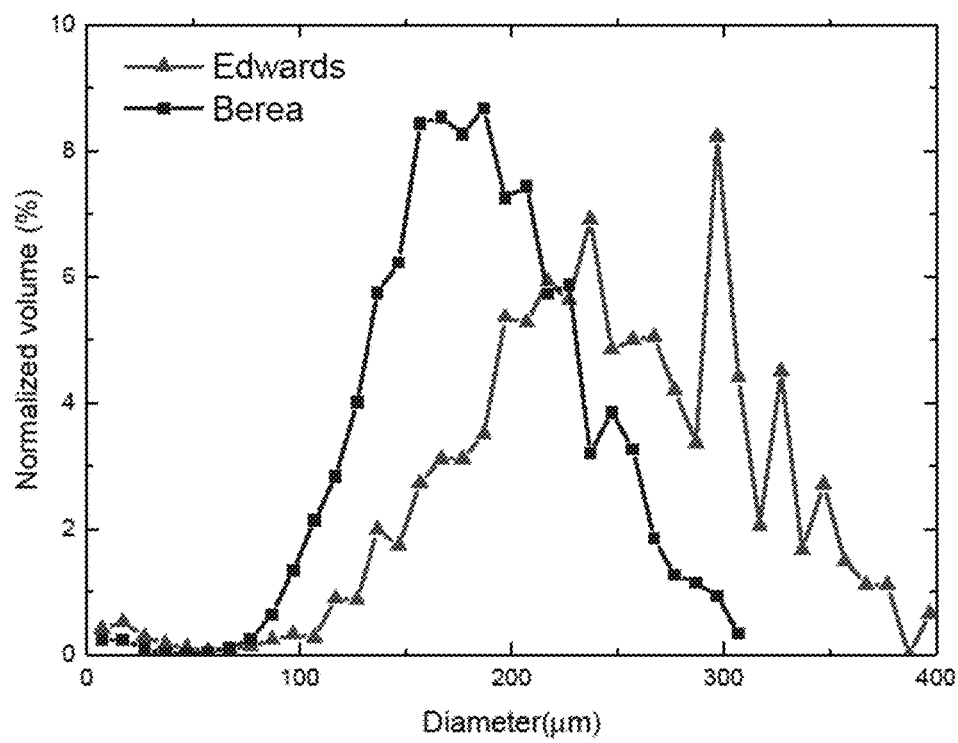
FIG. 1C. Pore size distribution of Edwards limestone and Berea sandstone rock samples.

Because the targeted reservoir samples were rich in calcite and quartz minerals, outcrop samples were used (i.e., Edwards limestone and Berea sandstone) as test porous media for surfactant screening steps using spontaneous imbibition. FIGS. 1A and 1B show two-dimensional images of Edwards limestone and Berea sandstone rock samples obtained using high-resolution X-ray microtomography and scanning electron microscopy. Pore size was characterized by image analysis using AvizoFire™ 9 software (FIG. 1C).

Figure 1D:
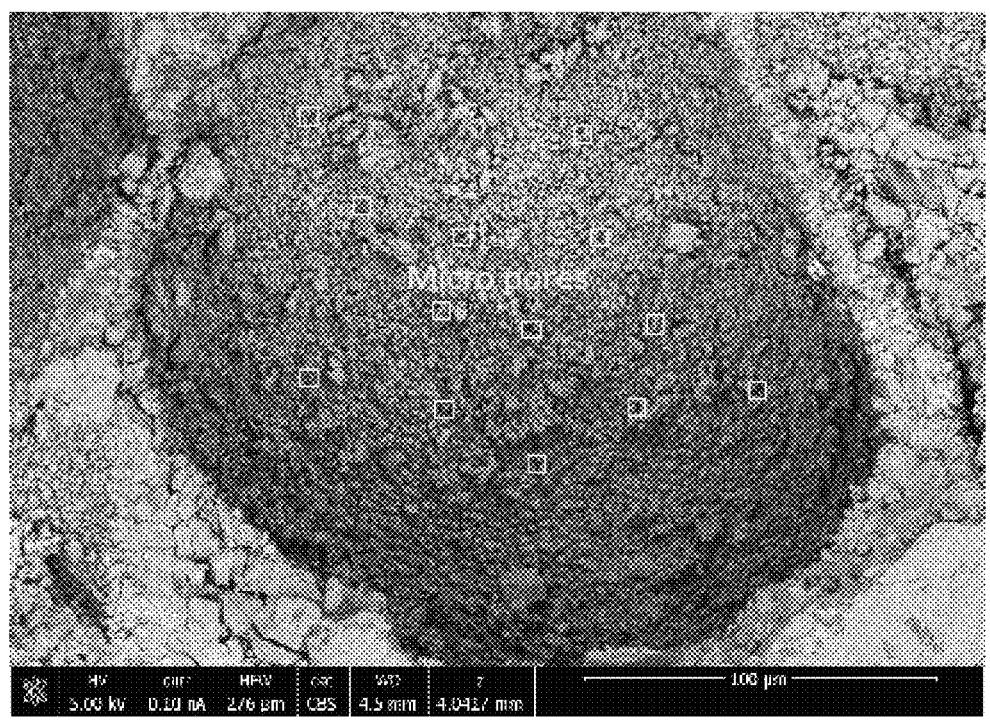
FIG. 1D. Scanning electron microscope (SEM) micrographs in backscattered electron mode (BSE) mode of Edwards limestone sample in pixel resolution of 0.5 µm.

A helium porosimeter-permeameter was also used to experimentally measure the porosity and permeability of the rocks. However, as it is shown in FIG. 1D, Edwards limestone contains micro pores below the resolutions of the captured images in FIG. 1A.

Table 1 lists dimensions and basic petrophysical properties of the core samples employed in the spontaneous imbibition tests.

TABLE 1

| Samples | Ave. Diameter (cm) | Ave. Length (cm) | Ave. ϕ% [a] | Ave. $K_{abs}$ (mD) [a] |
|---|---|---|---|---|
| Berea sandstone | 2.5 | 5 | 23 | 214 |
| Edwards limestone | 2.5 | 5 | 20 | 23 |
| Reservoir rock | 3.8 | 2.7 | 6.65 | 0.00381[b] |

[a] Porosity (ϕ) and permeability ($K_{abs}$) values were measured using helium porosimeter and permeameter.
[b] Reservoir rock average permeability (ave. $K_{abs}$) taken from S. Saraji, M. Piri, The representative sample size in shale oil rocks and nanoscale characterization of transport properties, International Journal of Coal Geology, vol. 146, pp. 42-54, 2015.

Table 2 lists the dimensions and petrophysical properties of Edwards limestone used in forced imbibition tests. Values were obtained using the forced imbibition system.

TABLE 2

| Sample no. | Exp. | Diameter (cm) | Length (cm) | Ave. $K_{abs}$ mD | Porosity % | Pore volume (cm³) |
|---|---|---|---|---|---|---|
| 1 | Base surfactant | 3.770 | 15.98 | 7.98 | 21.05 | 37.55 |
| 2 | EO-18 1st | 3.777 | 14.80 | 14.7 | 22.91 | 37.99 |
| 3 | EO-18 2nd | 3.765 | 14.61 | 13.97 | 21.50 | 34.97 |

The pore-to-throat aspect ratio of Edwards limestone and Berea sandstone was characterized as 4.76 and 3.89, respectively.

Crude oil from an unconventional reservoir was used, and its properties are listed in Table 3. The presented data was obtained from V. Mirchi, S. Saraji, L. Goual, and M. Piri, Dynamic interfacial tension and wettability of shale in the presence of surfactants at reservoir conditions, Fuel, vol. 148, pp. 127-138, 2015, which is incorporated by reference in its entirety. The oil was first centrifuged at 6000 rpm for one hour and then filtered with 0.5 µm metal filters before use.

TABLE 3

| Crude oil properties | |
|---|---|
| Density 20° C. (g/cc) | 0.81 |
| Viscosity (cp) | 2.804 |
| Asphaltene content (wt. %) | 0.45 |
| TAN (mg of KOH/g) | 0.23 |
| TBN (mg of KOH/g) | 0.68 |
| Refractive index | 1.46 |

Municipal water was used as the fracturing fluid and reservoir brine was synthesized to establish initial brine saturation in forced imbibition tests. The concentrations of the dominant cations and anions in municipal water and reservoir brine are listed in Table 4. Measured ion concentrations were comparable for different samples of municipal water. The pH of tap water and reservoir brine were neutral and their total dissolved solids (TDS) were about 120 and 320,000 ppm, respectively (V. Mirchi, S. Saraji, L. Goual, and M. Piri, Dynamic interfacial tension and wettability of shale in the presence of surfactants at reservoir conditions, Fuel, vol. 148, pp. 127-138, 2015).

TABLE 4

| Ions | Tap water (ppm) | Reservoir brine (ppm) |
|---|---|---|
| $Na^+$ | 8 | 102129 |
| $Ca^{2+}$ | 47 | 19805 |
| $Mg^{2+}$ | 14 | 1509 |
| $Cl^-$ | 7 | 196935 |
| $SO_4^{2-}$ | 18 | — |
| $NO_3^-$ | 10 | — |

POE-type nonionic surfactants were purchased from Stepan and Sigma Aldrich and were used without further purification. The chemical formula and structure of 14 poly(ethylene oxide) $R(OC_2H_4)_xOH$ surfactants with homologous chain distribution are presented in Table 5. In addition to these surfactants, a commercially-deployed nonionic surfactant (e.g., CRS-1080 from ChemEOR) was selected as a base surfactant for comparison.

TABLE 5

| Trade Name | Chemical structure |
|---|---|
| BIO-SOFT N91-2.5 | $CH_3(CH_2)_{8-10}(OC_2H_4)_{2.5}OH$ |
| BIO-SOFT N91-6 | $CH_3(CH_2)_{8-10}(OC_2H_4)_{6-6.5}OH$ |
| BIO-SOFT N91-8 | $CH_3(CH_2)_{8-10}(OC_2H_4)_{8.3}OH$ |
| BIO-SOFT N1-3 | $CH_3(CH_2)_{10}(OC_2H_4)_3OH$ |
| BIO-SOFT N1-5 | $CH_3(CH_2)_{10}(OC_2H_4)_5OH$ |
| BIO-SOFT N1-7 | $CH_3(CH_2)_{10}(OC_2H_4)_7OH$ |
| BIO-SOFT N1-9 | $CH_3(CH_2)_{10}(OC_2H_4)_9OH$ |
| BIO-SOFT N-23-3 | $CH_3(CH_2)_{11-12}(OC_2H_4)_3OH$ |
| BIO-SOFT N-23-6.5 | $CH_3(CH_2)_{11-12}(OC_2H_4)_{6.5}OH$ |
| BIO-SOFT EC-639 | $CH_3(CH_2)_{11-12}(OC_2H_4)_{8.2}OH$ |
| BIO-SOFT N-25-3 | $CH_3(CH_2)_{11-14}(OC_2H_4)_3OH$ |
| BIO-SOFT N-25-7 | $CH_3(CH_2)_{11-14}(OC_2H_4)_{7.25}OH$ |
| BIO-SOFT N-25-9 | $CH_3(CH_2)_{11-14}(OC_2H_4)_9OH$ |
| Poly(ethylene glycol)(18) tridecyl ether | $CH_3(CH_2)_{12}(OC_2H_4)_{18}OH$ |

Figure 2:
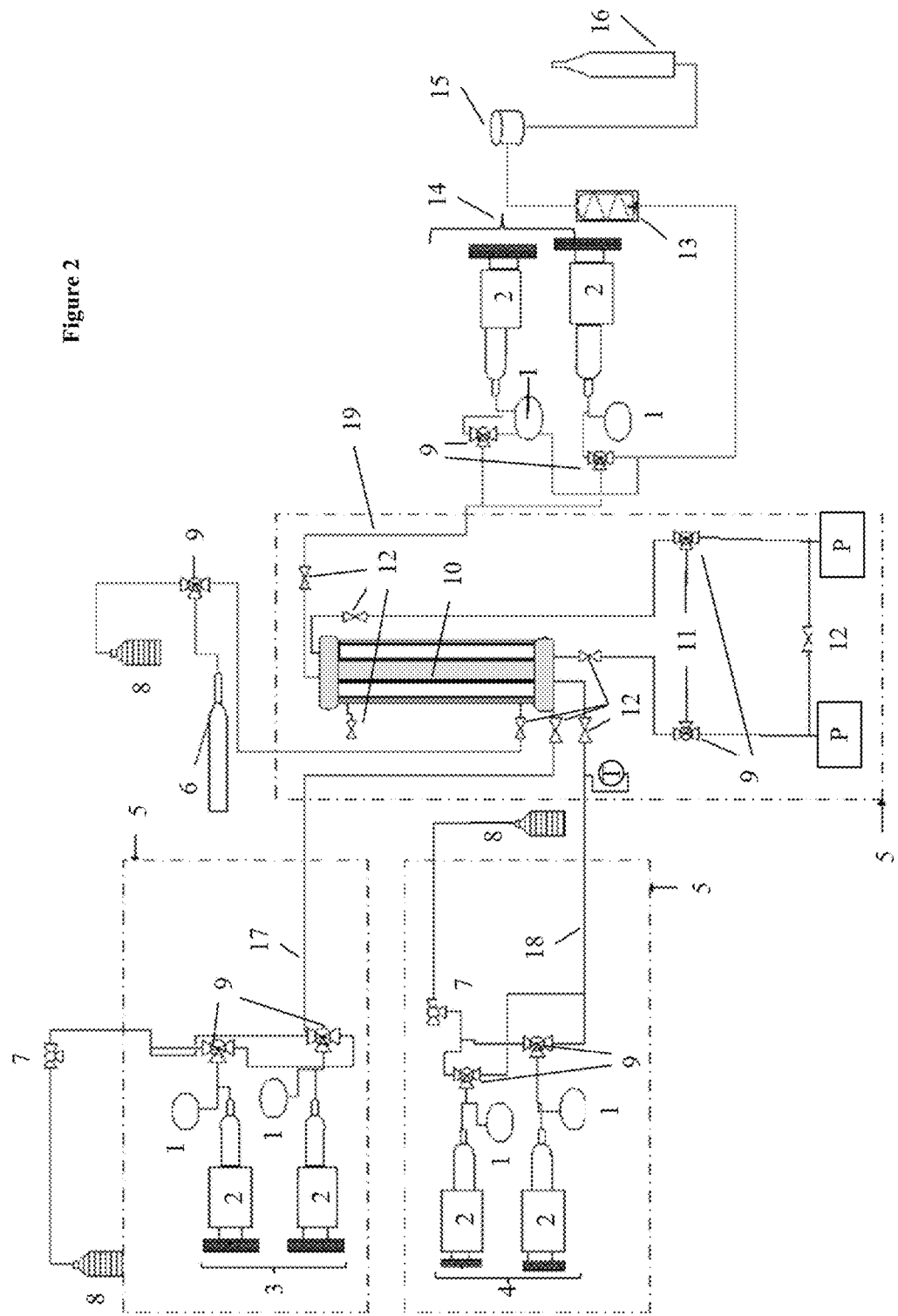
FIG. 2. Schematic diagram of the forced imbibition system.
Figure 3A:
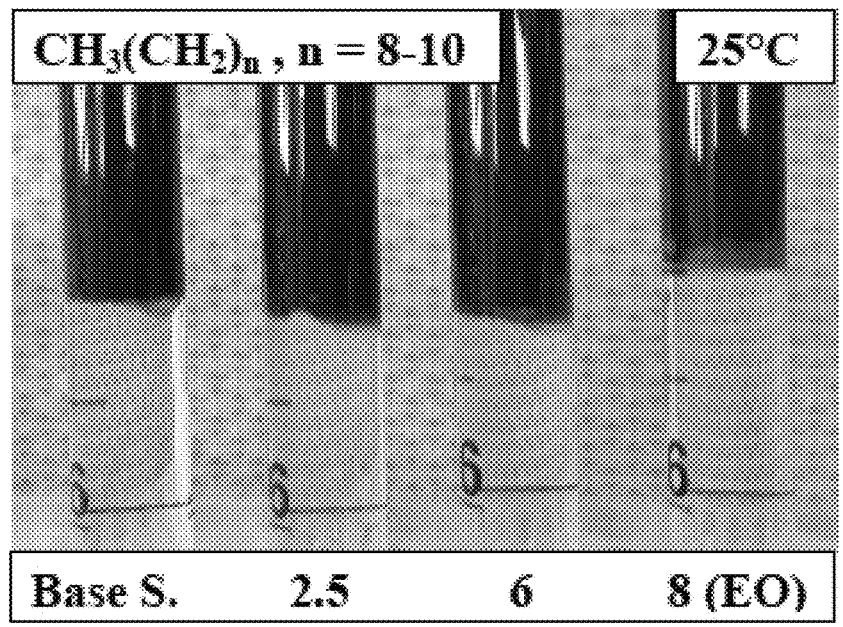
FIG. 3A. Phase behavior tests with crude oil and surfactant solutions (0.1 wt. %) at ambient temperature for ethylene oxide chains of different lengths (EO: number of ethylene oxides) and a $CH_3(CH_2)_n$ alkyl chain wherein n=8-10.
Figure 3B:
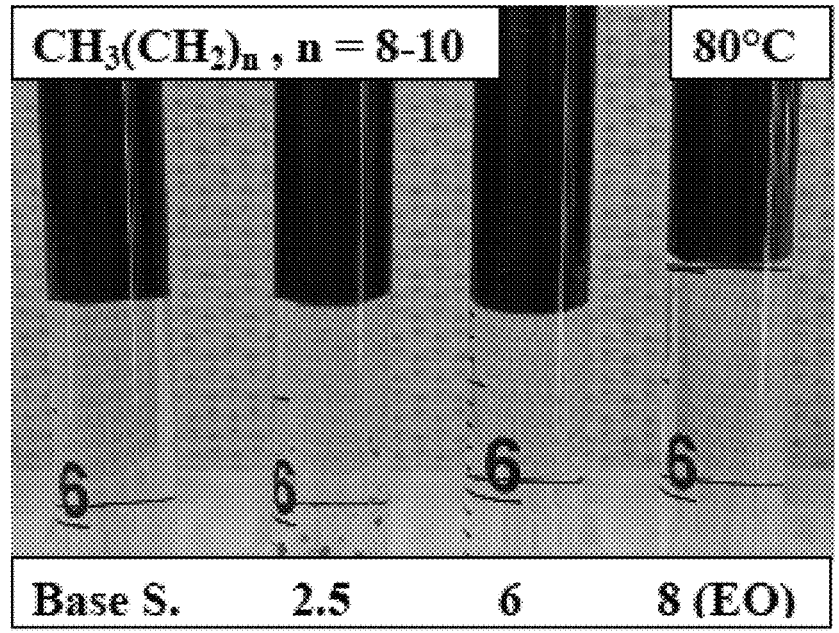
FIG. 3B. Phase behavior tests with crude oil and surfactant solutions (0.1 wt. %) at 80° C. for ethylene oxide chains of different lengths (EO: number of ethylene oxides) and a $CH_3(CH_2)_n$ alkyl chain wherein n=8-10.
Figure 3C:
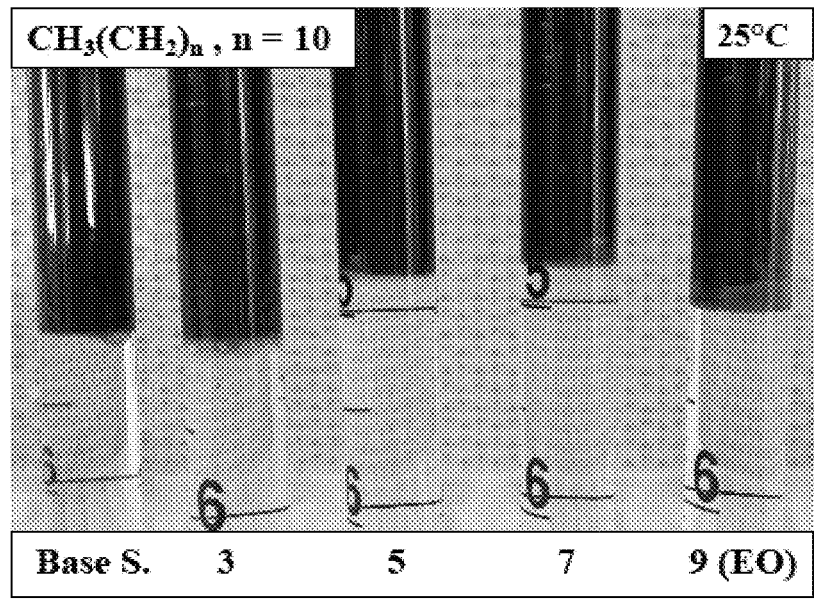
FIG. 3C. Phase behavior tests with crude oil and surfactant solutions (0.1 wt. %) at ambient temperature for ethylene oxide chains of different lengths (EO: number of ethylene oxides) and a $CH_3(CH_2)_n$ alkyl chain wherein n=10.
Figure 3D:
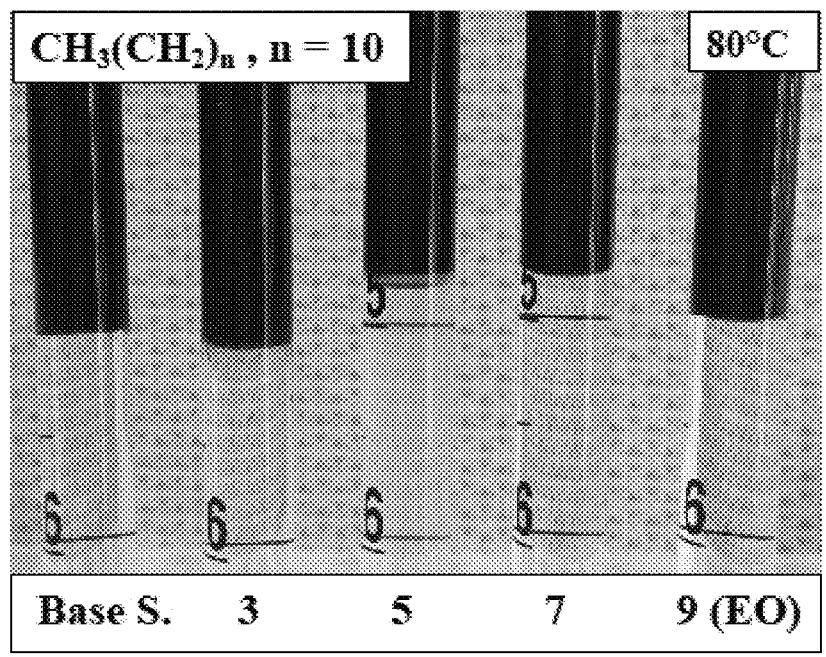
FIG. 3D. Phase behavior tests with crude oil and surfactant solutions (0.1 wt. %) at 80° C. for ethylene oxide chains of different lengths (EO: number of ethylene oxides) and a $CH_3(CH_2)_n$ alkyl chain wherein n=10.
Figure 3E:
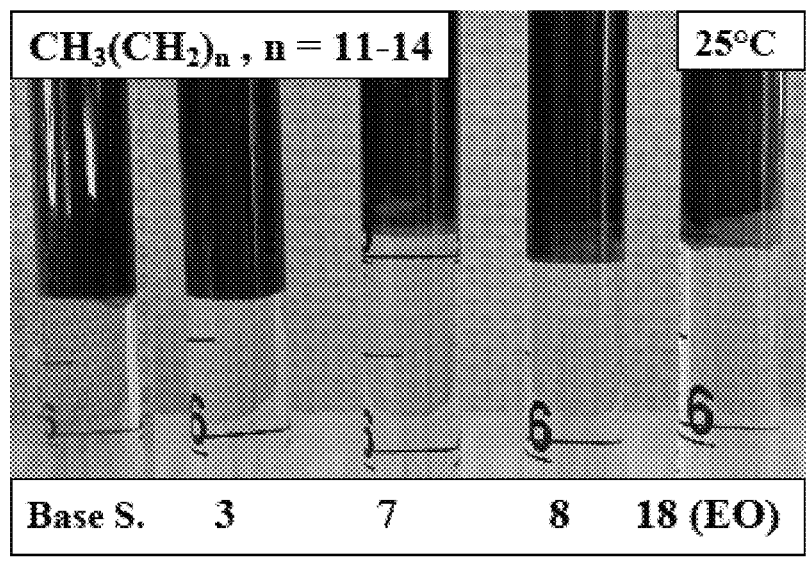
FIG. 3E. Phase behavior tests with crude oil and surfactant solutions (0.1 wt. %) at ambient temperature for ethylene oxide chains of different lengths (EO: number of ethylene oxides) and a $CH_3(CH_2)_n$ alkyl chain wherein n=11-14.
Figure 3F:
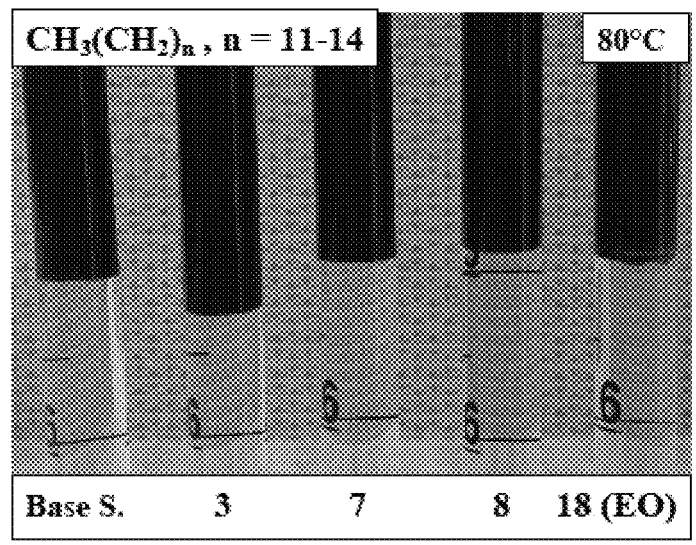
FIG. 3F. Phase behavior tests with crude oil and surfactant solutions (0.1 wt. %) at 80° C. for ethylene oxide chains of different lengths (EO: number of ethylene oxides) and a $CH_3(CH_2)_n$ alkyl chain wherein n=11-14.

FIG. 2 describes the forced imbibition system. The labels in FIG. 2 represent the following components:

| | |
|---|---|
| P | Pressure transducer |
| T | Thermocouple |
| 1 | Rupture disk |
| 2 | Quizix 5000 |
| 3 | Oil pump |
| 4 | Brine pump |
| 5 | Large oven |
| 6 | Manual overburden pressure pump |
| 7 | Three-way manual valve |
| 8 | Liquid accumulator |
| 9 | Three-way Vindum valve |
| 10 | Core holder |
| 11 | Pressure array |
| 12 | Two-way manual valve |
| 13 | Cooling bath |
| 14 | Back pressure pump |
| 15 | Back pressure regulator valve |
| 16 | Graduated burette |
| 17 | Oil line |
| 18 | Brine line |
| 19 | Outlet line |

Phase Behavior

Phase behavior tests were performed in accordance with the invention to evaluate surfactants' tendency for emulsification.

In the phase behavior tests, test tubes with a brine/oil ratio of 1:1 and a fixed salinity of 120 ppm (tap water) were capped and shaken for 60 minutes with an incubator shaker at a speed of 350 strokes/minute. For ambient temperatures, the tubes were used at 20° C. For elevated temperatures (i.e., reservoir temperatures), the tubes were placed in an oven for 24 hours at 80° C.

Visual phase behavior tests were performed at ambient (20° C.) and elevated temperatures (80° C.) to evaluate surfactants' tendency for emulsification. All visual phase behavior tests were performed at a water/oil ratio of 1:1. A relationship between surfactant structure and emulsification behavior, shown in FIGS. 3A-3F, was identified using alcohol ethoxylates with varying ethoxylate (EO) side chains and $CH_3(CH_2)_n$ side chains.

As shown in FIGS. 3A-3F, for fixed alkyl chains of 8-10, 10, and 11-14, increasing the number of ethylene oxide moieties in the hydrophilic chain increases the amount of microemulsion phase observed in the middle of the test tube. This trend was particularly evident in surfactants with longer hydrophobic chains. FIGS. 3A-3F exhibit classical Winsor type III phase behavior, wherein a surfactant-rich middle phase coexists with both the oil and brine phases (J. Eastoe, Advanced surfactants and interfaces, Bristol UK, 2003). The base surfactant, however, did not produce a third phase between the oil and brine phases.

FIGS. 3A-3F display the impact of temperature on the phase behavior of crude oil and surfactant solutions with different molecular structures. As shown in this figure, temperature affects microemulsion stability. Increasing temperature to 80° C. destabilized the microemulsion phase produced by various surfactant structures. Temperature impacts the physical properties of the crude oil, water, and surfactant molecules, leading to a reduction of surfactant solubility and a breaking of the emulsion/microemulsion phase. Temperature can also increase the kinetic energy of molecules in droplets and induce their coalescence. Jones et al. studied the effect of temperature on the stability of crude oil/water interfacial films and suggested that an increase in temperature may cause destabilization of crude oil/water interfacial films (T. J. Jones, E. L. Neustadter, K. P. Whittingham, Water-In-Crude Oil emulsion stability and emulsion destabilization by chemical demulsifiers. Petroleum Society of Canada, April 1978). However, as shown in FIGS. 3A-3F, although increasing the degree of ethoxylation in POE-type surfactants induced the formation of emulsions/microemulsions, these emulsions/microemulsions were destabilized at elevated temperatures. Thus, emulsions will likely not cause operational difficulties when highly ethoxylated POE surfactants are used in tight formations at high temperatures.

Cloud Point Temperature

Cloud point temperature tests were performed in accordance with the invention to evaluate surfactants' solubility.

The solubility and state of orientation between water/oil molecules and hydrophilic/lipophilic parts of surfactants changes as temperature is altered. The hydration force is inversely dependent on temperature (M. J. Schick, Nonionic surfactants physical chemistry, CRC Press, 1987; K. Shinoda, The correlation between the dissolution state of nonionic surfactant and the type of dispersion stabilized with the surfactant, Journal of Colloid and Interface Science, vol. 24, no. 1, pp. 4-9, 1967; and T. Mitsui, S. Nakamura, F. Harusawa, Y. Machida, Changes in the interfacial tension with temperature and their effects on the particle size and stability of emulsions, Kolloid-Zeitschrift and Zeitschrift für Polymere, vol. 250, no. 3, pp. 227-230, 1972). In addition, increasing temperatures causes dehydration of POE chains of nonionic surfactant solutions, which results in fewer interactions with water molecules and thus exhibits solution cloudiness (T. F. Tadros, Applied surfactants: principles and applications, Wiley-VCH, 2005). Thus, to establish a comprehensive evaluation of surfactant performance, the aqueous solubility of nonionic surfactants should be assessed at various temperatures.

Solubility trends are attributed to hydrophilicity/hydrophobicity characteristics of surfactants (F. Curbelo, A. Garnica, E. Neto, Salinity effect in cloud point phenomena by nonionic surfactants used in enhanced oil recovery tests, Petroleum Science and Technology, vol. 31, pp. 1544-1552, 2013; M. J. Rosen and J. T. Kunjappu, Surfactants and Interfacial Phenomena, Wiley, 2012). Hydration of POE chains requires hydrogen bonding with several water molecules depending on the moles of POE (H. Schott, Hydration of Micellar Nonionic Detergents, Journal of Colloid and Interface science, vol. 24, no. 2, pp. 193-198, 1967; M. J. Schick, Nonionic surfactants physical chemistry, CRC Press, 1987).

Investigation on the effect of structural arrangement of POE surfactants including alkyl chain and ethylene oxide on solubility of surfactants was accomplished by cloud point measurements. Surfactant solutions were injected into a Hastelloy measurement cell using a Quizix pump. After reaching reservoir pressure (6840 psi), surfactant solutions were heated using a heating jacket (Glas-col, LLC) firmly wrapped around the measurement cell. The temperature was gradually raised ($\cong$0.4° C./min) from ambient temperature to 120° C. (reservoir temperature). A mounted resistance temperature detector (RTD) inside the measurement cell (with accuracy of ±0.1° C.) was used to check the internal temperature. Surfactant solutions were then monitored visually by a digital camera attached to a microscope. The temperature above which surfactant solutions became turbid was identified as the CPT.

Figure 4:
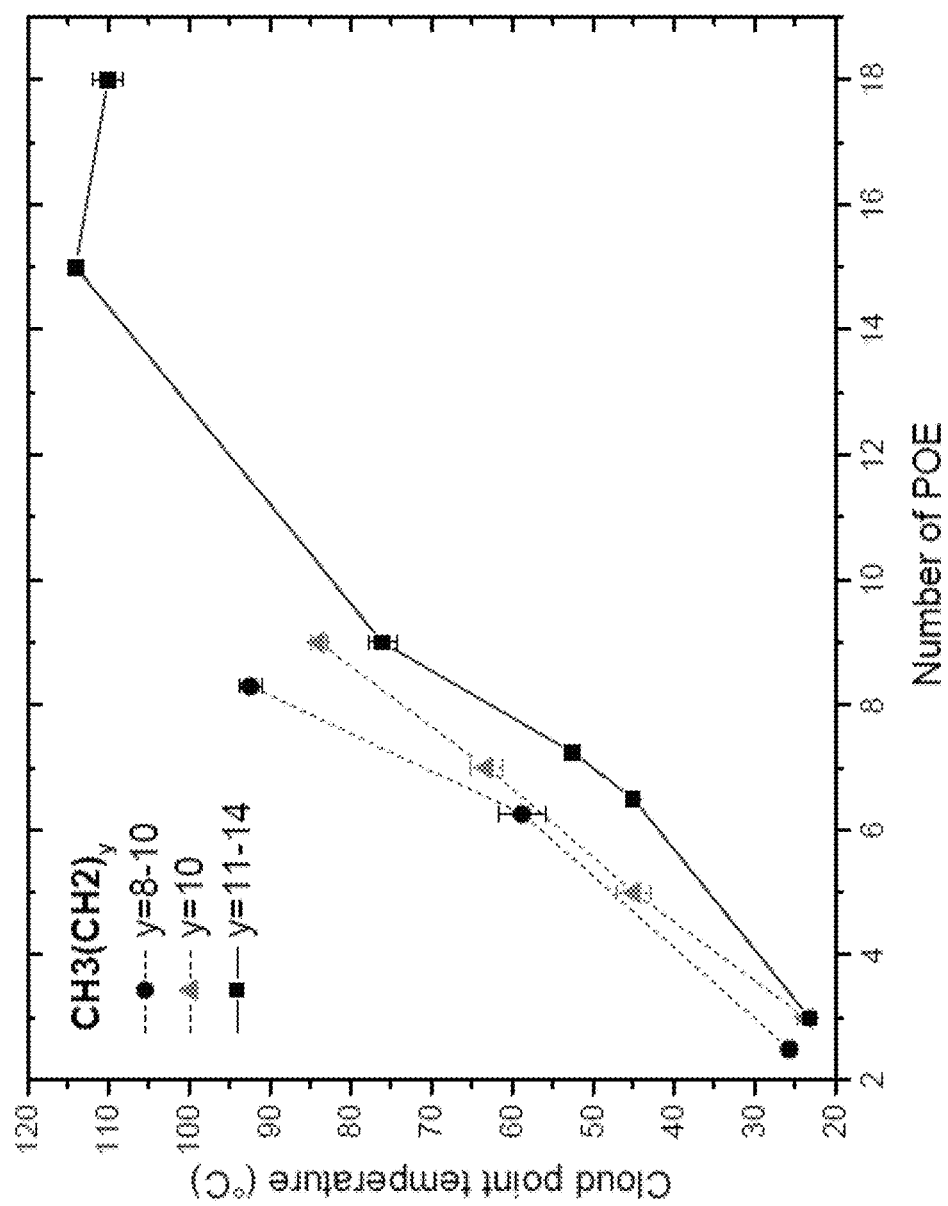
FIG. 4. Effect of hydrophilic and hydrophobic chain length on CPT at 6840 psi (y=number of alkyl molecules).

It was found that lengthening of POE chain for different alkyl chains ($(CH_2)_{8-10}$, $(CH_2)_{10}$, and $(CH_2)_{12}$) increased the CPT in POE-type nonionic surfactants. The most hydrophilic surfactant, with 18 ethylene oxides, exhibited a CPT of 109.6° C. Although this surfactant solution became cloudy at reservoir temperatures, this surfactant exhibited good aqueous solubility. FIG. 4 also shows that lengthening of the alkyl chain length for different POE chains reduced the CPT in POE-type nonionic surfactants.

The CPTs of certain selected surfactants were also measured at atmospheric pressure in a water bath. Comparison of the CPTs determined at atmospheric and reservoir pressures revealed that pressure has a negligible effect on surfactant turbidity. The measured CPTs for the selected surfactants are presented in FIG. 4. The base surfactant exhibited a low CPT (46.1° C.±1.7) in comparison with the selected surfactants.

Interfacial Tension

Interfacial tension tests were carried out in accordance with the invention. Dynamic IFT and contact angles were measured using rising/captive bubble tensiometry enhanced by image acquisition with a high-resolution Charged Coupled Device (CCD) digital camera and apochromatically-corrected lens. The apparatus includes a Hastelloy measurement cell, a Hastelloy dual-cylinder pulse-free Quizix pump (to provide constant flow rate and pressure), a temperature control module, a data acquisition computer, an oven, and an in-line density meter (Anton Paar DMA HPM) to measure the density of fluids at actual experimental conditions. The system tolerates reservoir conditions with pressures and temperatures up to 10,000 psi and 150° C., respectively (V. Mirchi, S. Saraji, L. Goual, M. Piri, Dynamic interfacial tension and wettability of shale in the presence of surfactants at reservoir conditions, Fuel, vol. 148, pp. 127-138, 2015).

For IFT measurements, after establishing ambient (e.g., 14.7 psi and 20° C.) or reservoir conditions (e.g., 6840 psi and 120° C.) in a cell saturated with brine, a bubble of crude oil was created inside the measurement cell through a needle (0.3-1.6 mm outside diameter). Images of oil bubbles were captured at 5-second intervals to measure dynamic interfacial tension. IFT values were obtained by fitting the drop profile to the Young-Laplace equation using Axisymetric Drop Shape Analysis (ADSA) software.

A series of dynamic IFT measurements with municipal water and crude oil were performed at ambient conditions to examine the surface activity of selected surfactants. FIGS. 5A-5F present dynamic IFT results of a homologous series of nonionic surfactant solutions with 0.1% wt concentration, which is above the critical micelle concentration (CMC) of all the surfactants studied. The size of the hydrophobic and hydrophilic parts of the surfactants were altered independently and their impact on oil/brine interfacial tension was investigated.

In addition, the dynamic IFT of certain surfactants was measured at reservoir conditions. In particular, the impact of elevated temperatures and pressures on the performance of these surfactants was evaluated. IFT values of crude oil and surfactant solutions were measured at 6840 psi and 120° C. FIGS. 6A-6E exhibit the measured IFTs at ambient and reservoir conditions.

Figure 5A:
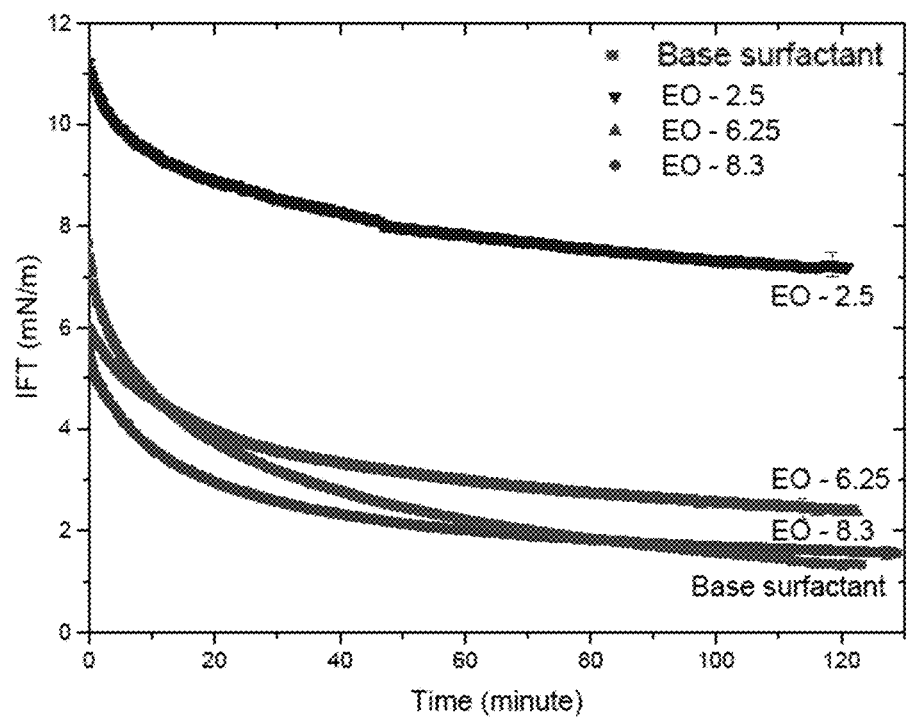
FIG. 5A. Effect of changes in the hydrophilic chain length (EO: number of ethylene oxides) of surfactant molecules on dynamic interfacial tensions at ambient conditions. All surfactant molecules tested had a hydrophobic $CH_3(CH_2)_n$ alkyl chain wherein n=8-10. The interfacial tension for tap water/crude oil was determined to be 18.88±0.68 mN/m. In descending order of its starting point on the y-axis, the data corresponds to: EO—2.5, base surfactant, EO—6.25, and EO—8.3.
Figure 5B:
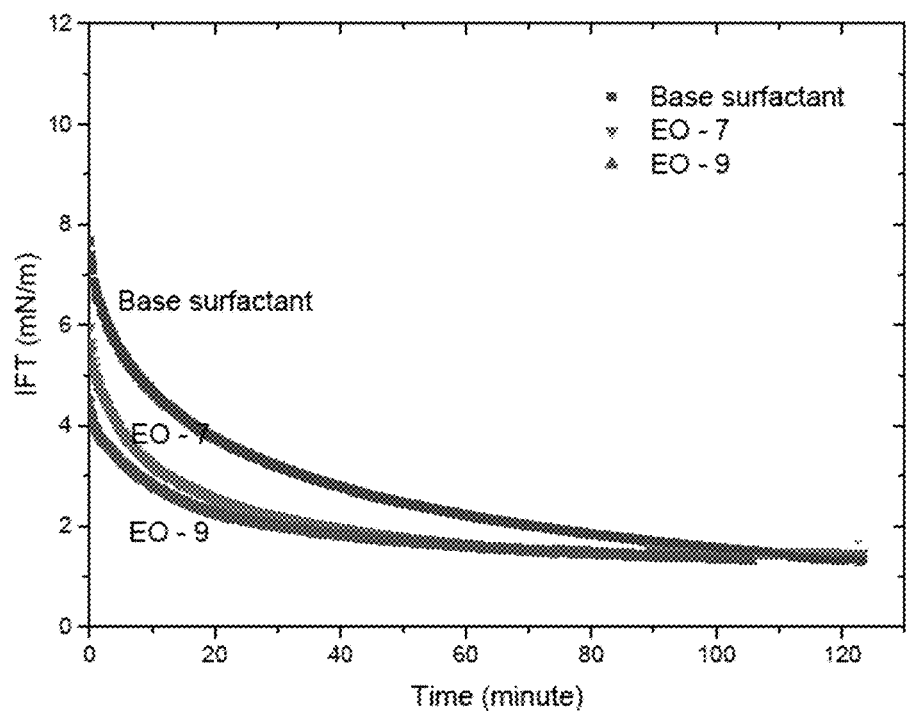
FIG. 5B. Effect of changes in the hydrophilic chain length (EO: number of ethylene oxides) of surfactant molecules on dynamic interfacial tensions at ambient conditions. All surfactant molecules tested had a hydrophobic $CH_3(CH_2)_n$ alkyl chain wherein n=10. The interfacial tension for tap water/crude oil was determined to be 18.88±0.68 mN/m. In descending order of its starting point on the y-axis, the data corresponds to: base surfactant, EO—7, and EO—9.
Figure 5C:
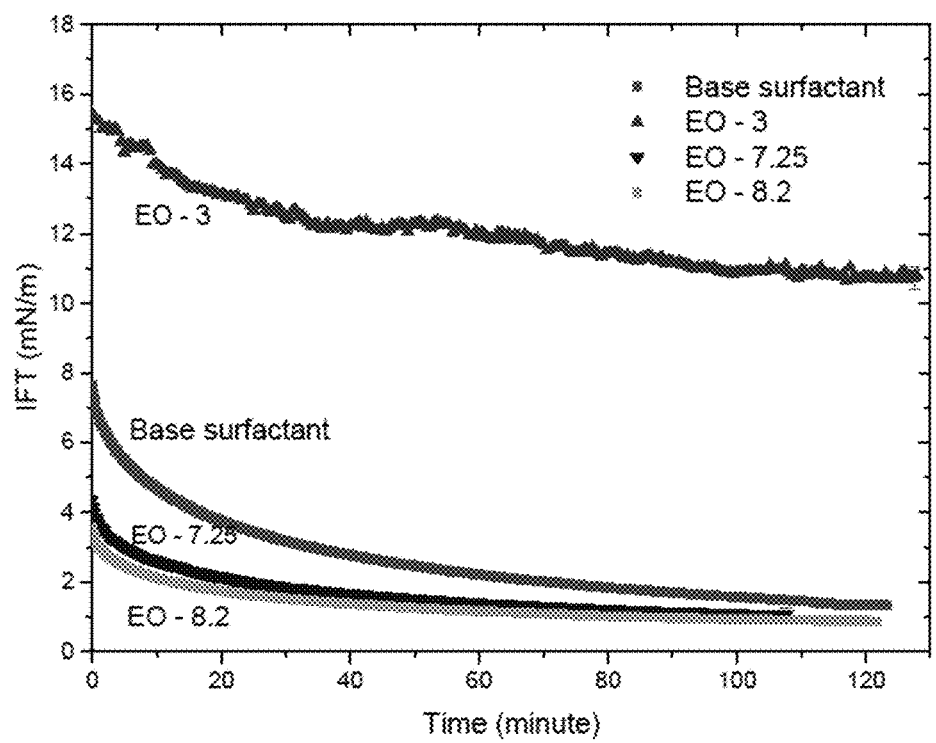
FIG. 5C. Effect of changes in the hydrophilic chain length (EO: number of ethylene oxides) of surfactant molecules on dynamic interfacial tensions at ambient conditions. All surfactant molecules tested had a hydrophobic $CH_3(CH_2)_n$ alkyl chain wherein n=11-14. The interfacial tension for tap water/crude oil was determined to be 18.88±0.68 mN/m. In descending order of its starting point on the y-axis, the data corresponds to: EO—3, base surfactant, EO—7.25, and EO—8.2.

As shown in FIG. 5A, increasing the degree of ethoxylation (from very small amount of 2.5 to 8.3 moles) reduced the IFT between oil and brine in a surfactant series with a fixed hydrocarbon chain length of 8-10 methylene units. Similar results were observed when increasing the degree of ethoxylation in surfactants with alkyl chains comprising 10 and 11-14 methylene units (FIGS. 5B and 5C), which may be attributed to surfactants' solubilization capacity in the aqueous phase. Dissolution in water is limited for small polar heads (e.g., small ethylene oxide heads), as hydration forces affect solubility. As a result, cloudy brine solutions are formed. On the other hand, polar head elongation (e.g., ethylene oxide chain elongation) enhances surfactants' aqueous solubility, resulting in a greater molecular migration to the interface and a reduction in IFT. Surfactant precipitation in brine solution was observed at ambient conditions using molecules with EO of 2.5 and 3.

Figure 5D:
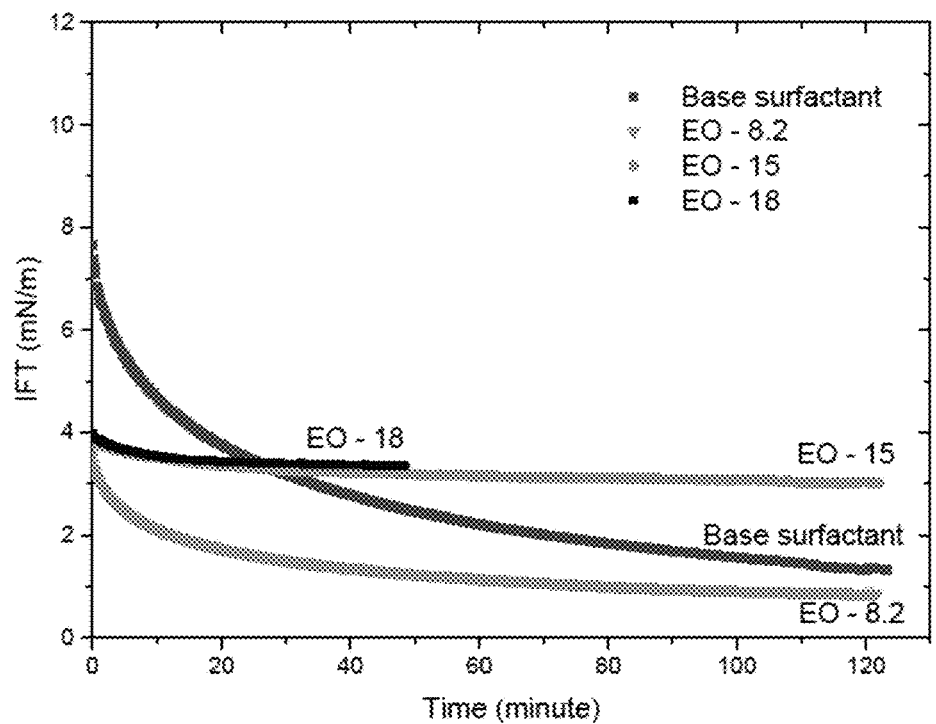
FIG. 5D. Effect of changes in the hydrophilic chain length (EO: number of ethylene oxides) of surfactant molecules on dynamic interfacial tensions at ambient conditions. All surfactant molecules tested had a hydrophobic $CH_3(CH_2)_n$ alkyl chain wherein n=11-14. The interfacial tension for tap water/crude oil was determined to be 18.88±0.68 mN/m. In descending order of its starting point on the y-axis, the data corresponds to: base surfactant, EO—18, EO—15, and E—8.2.

Increase in the degree of ethoxylation from 8 to 18 moles induced an increase in interfacial tension with fast equilibrium, as shown in FIG. 5D. Many factors may impact surfactants' adsorption effectiveness at liquid/liquid interfaces. Surface excess concentration (i.e., surface concentration, $\Gamma_m$) indicates surfactant effectiveness and is inversely proportional to the area per molecule that surfactants occupy at the interface at surface saturation $a_m^s$ (M. J. Rosen and J. T. Kunjappu, Surfactants and Interfacial Phenomena, Wiley, 2012). Changes in the hydrophilic group induce significant structural impact on $\Gamma_m$ (F. Van Voorst Vader, Adsorption of detergents at the liquid-liquid interface part 1, Transactions of the Faraday Society, vol. 56, pp. 1067-1077, 1960). Changes in the hydrophilic chain influence the area per molecule of polyethylenated nonionic surfactants at the interface. In a surfactant series with a fixed hydrophobic chain length, the area per molecule rises as the ethylene oxide number increases. Consequently, the oil/brine interface is occupied by fewer surfactant molecules, causing a higher IFT. Moreover, an increase in molecular size results in faster interface saturation and faster equilibrium.

Changes in the hydrophilic/hydrophobic balance (HLB) of a polypropylene glycol ethoxylate surfactant series leads to IFT changes (P. D. Berger, C. Hsu, and J. P. Arendell, Designing and selecting demulsifiers for optimum field performance on the basis of production fluid characteristics, SPE Production Engineering, vol. 3, no. 4, pp. 522-526, 1988). Specifically, an increase in HLB to a certain value results in an IFT reduction, while further increase in HLB results in an IFT increase.

As shown by Equation 1, three typical regions of dynamic IFT reduction exist: (I) induction region, (II) rapid fall region, and (III) mesoequilibrium region (X. Y. Hua, M. J.

Rosen, Dynamic surface tension of aqueous surfactant solutions: I. Basic parameters, Journal of Colloid and Interface Science, vol. 124, no. 2, pp. 652-659, 1988).

$$\log(\gamma_0-\gamma_t)-\log(\gamma_t-\gamma_m)=n \log t-n \log t^* \quad (1)$$

In Equation 1, $\gamma_t$ is the IFT of surfactant solution at time t, $\gamma_m$ is the mesoequilibrium interfacial tension (when $\gamma_t$ is almost stabilized), $\gamma_o$ is the IFT in the absence of surfactant, and t* is the required time for IFT to reach half of its value between $\gamma_o$ and $\gamma_m$. The value of n is a constant number related to the structure of surfactants and correlates to the difference between surfactants' adsorption and desorption. Increasing nonionic surfactants' polyoxyethylene chain length reduces the value of n (T. Gao, M. J. Rosen, Dynamic surface tension of aqueous surfactant solutions: 7. physical significance of dynamic parameters and the induction period, Journal of Colloid and Interface Science, vol. 172, no. 1, pp. 242-248, 1995).

At a constant surfactant concentration, the maximum rate of change in surface tension decreases as n declines. Therefore, increasing EO chain length or decreasing n induces a smaller difference between equilibrium IFT and IFT at any given time, resulting in instantaneous equilibrium.

Values of t* were calculated for a series of surfactants, as shown in Table 7. An increase in the degree of ethoxylation was observed to reduce the time required for IFT to reach half of its value.

TABLE 7

Impact of POE chain length on time and oil recovery.

| No. of $CH_2$ | No. of EO | t* (min.) | Recovery from Edwards (%) |
|---|---|---|---|
| 8-10 | 2.5 | 16.5 | 42.69 ± 1.37 |
| | 6 | 12.3 | 44.94 ± 1.16 |
| | 8 | 11.6 | 45.41 ± 1.5 |
| 11-14 | 3 | 23 | 41.69 ± 2.29 |
| | 7.25 | 9.3 | 45.7 ± 1.16 |
| | 8.2 | 7.83 | 46.78 ± 1.24 |
| | 18 | 3.5 | 48.8 ± 1.61 |
| Base surfactant | — | 15.66 | 43.87 ± 1.5 |

Figure 5E:
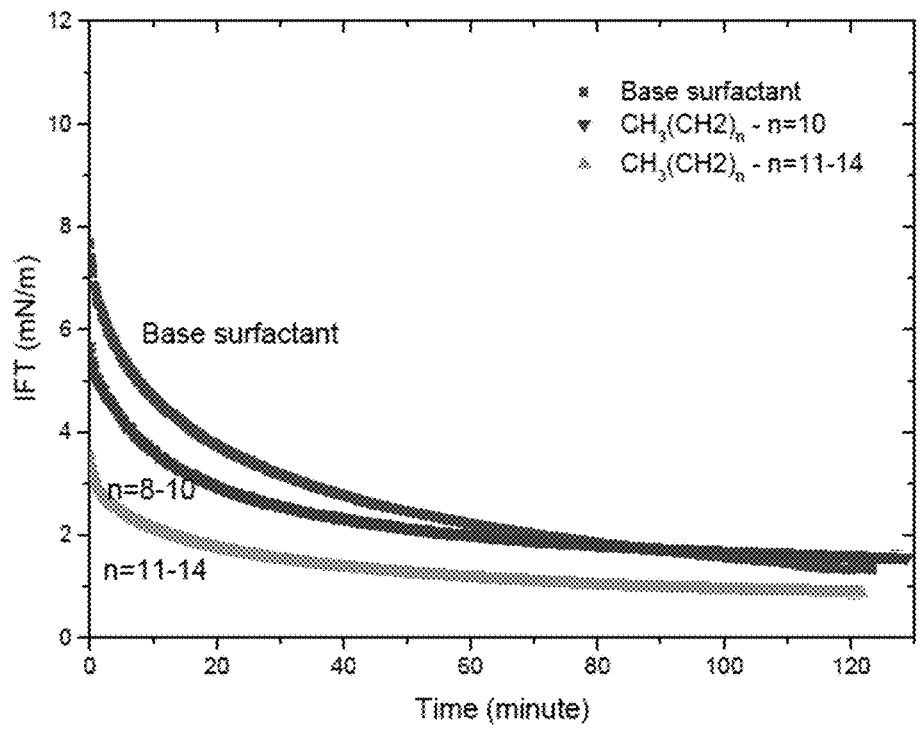
FIG. 5E. Effect of changes in the hydrophobic chain length of surfactant molecules on dynamic interfacial tensions at ambient conditions. All surfactant molecules tested had an EO—8 hydrophilic chain. The interfacial tension for tap water/crude oil was determined to be 18.88±0.68 mN/m. In descending order of its starting point on the y-axis, the data corresponds to: base surfactant, $CH_3(CH_2)_n$ with n=8-10, and $CH_3(CH_2)_n$ with n=11-14.
Figure 5F:
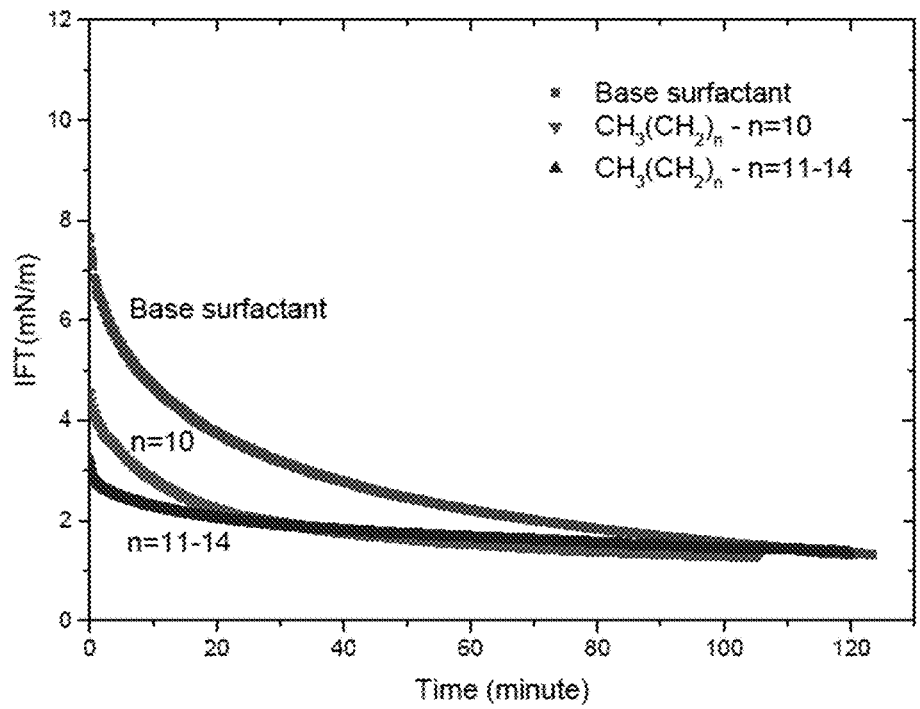
FIG. 5F. Effect of changes in the hydrophobic chain length of surfactant molecules on dynamic interfacial tensions at ambient conditions. All surfactant molecules tested had an EO—9 hydrophilic chain. The interfacial tension for tap water/crude oil was determined to be 18.88±0.68 mN/m. In descending order of its starting point on the y-axis, the data corresponds to: base surfactant, $CH_3(CH_2)_n$ with n=10, and $CH_3(CH_2)_n$ with n=11-14.

FIGS. 5E and 5F illustrate the impact of increasing the hydrophobic chain of surfactants on oil/brine IFT. It was observed that addition of methylene groups in the alkyl chain, lowers the IFT. In a surfactant series with a fixed oxyethylene chain length, an increase in alkyl chain length results in minor increases in surfactant adsorption effectiveness at the interface, which may be due to effects on the surface excess concentration by the number of methylene groups in the alkyl chain. (D. Attwood, A. T. Florence, Surfactant systems: their chemistry, pharmacy and biology, Lippincott Williams & Wilkins, 1983; M. J. Rosen and J. T. Kunjappu, Surfactants and Interfacial Phenomena, Wiley, 2012).

In FIGS. 6A-6D, the difference between IFT values measured at ambient conditions and at reservoir conditions decreased with increasing surfactant hydrophilicity. That is, surfactants with higher CPTs exhibited smaller differences between IFT values measured at ambient conditions and at reservoir conditions. A larger area coverage by surfactant molecules reduces surfactant concentration at the oil/brine interface. Therefore, the surface activity of surfactants at higher temperature declines, leading to greater IFT (M. J. Rosen and J. T. Kunjappu, Surfactants and Interfacial Phenomena, Wiley, 2012).

Figure 6A:
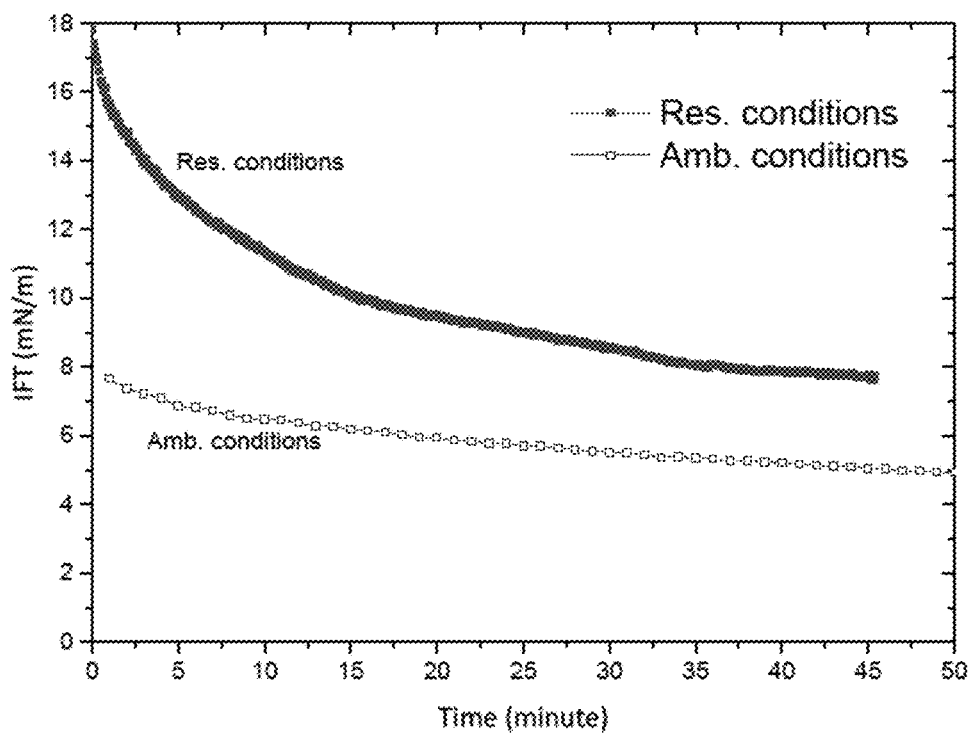
FIG. 6A. Effect of temperature on dynamic IFT of base surfactant solution/crude oil at reservoir conditions (6840 psi and 120° C.). In descending order of its starting point on the y-axis, the data corresponds to: reservoir conditions, ambient conditions.
Figure 6B:
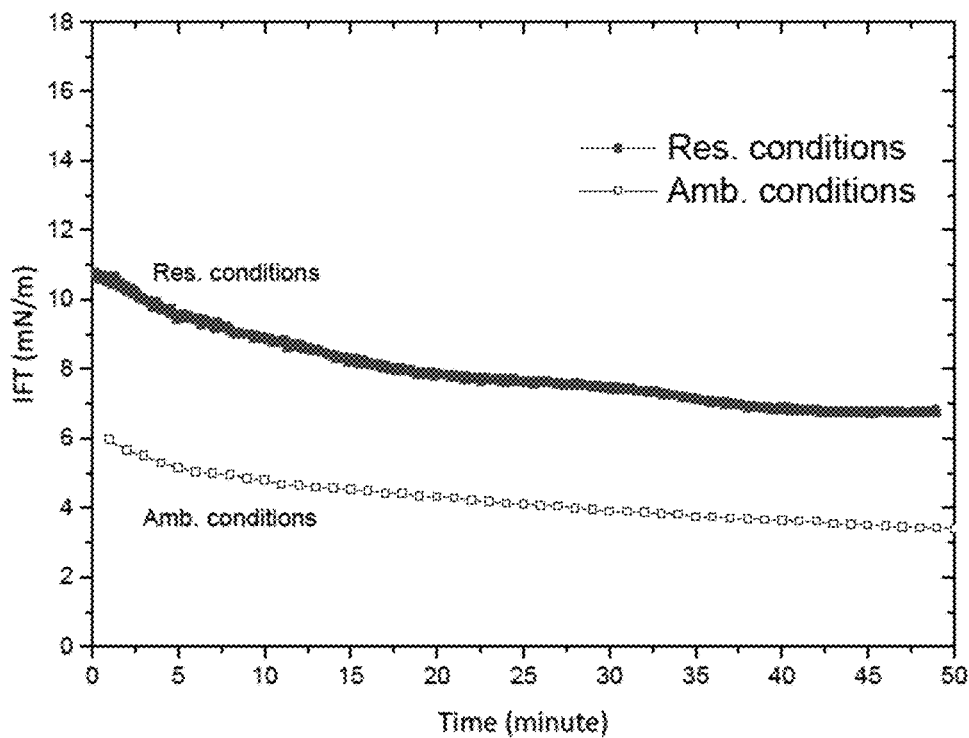
FIG. 6B. Effect of temperature on dynamic IFT of surfactant solution/crude oil at reservoir conditions (6840 psi and 120° C.), wherein the surfactant comprises a hydrophobic $CH_3(CH_2)_n$ chain with n=10 and a hydrophilic EO—7 chain (EO: number of ethylene oxides). In descending order of its starting point on the y-axis, the data corresponds to: reservoir conditions, ambient conditions.
Figure 6C:
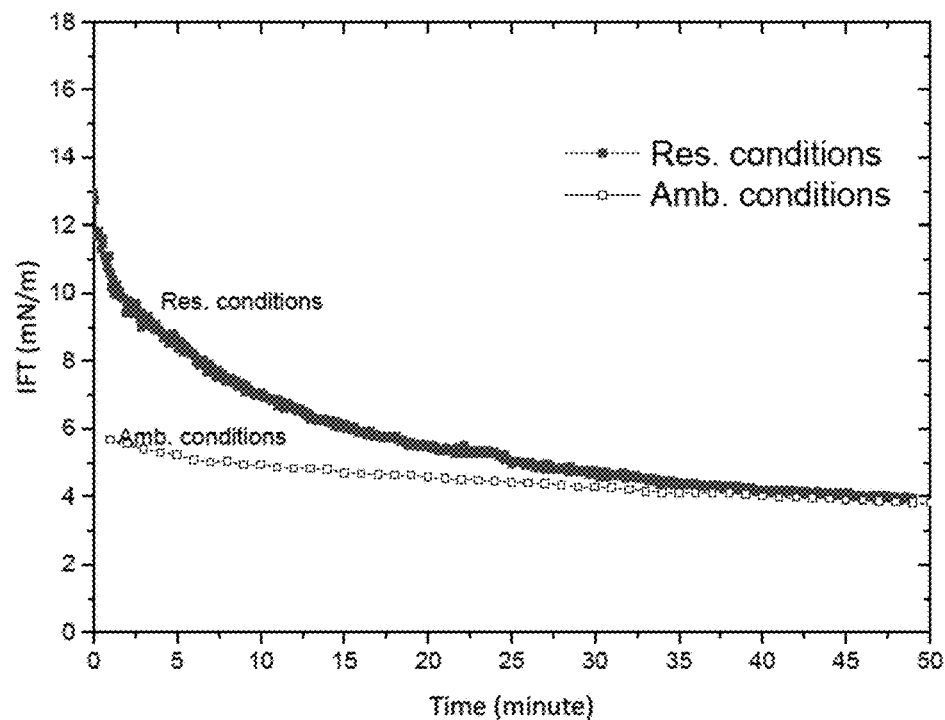
FIG. 6C. Effect of temperature on dynamic IFT of surfactant solution/crude oil at reservoir conditions (6840 psi and 120° C.), wherein the surfactant comprises a hydrophobic $CH_3(CH_2)_n$ chain with n=8-10 and a hydrophilic EO—8 chain (EO: number of ethylene oxides). In descending order of its starting point on the y-axis, the data corresponds to: reservoir conditions, ambient conditions.
Figure 6D:
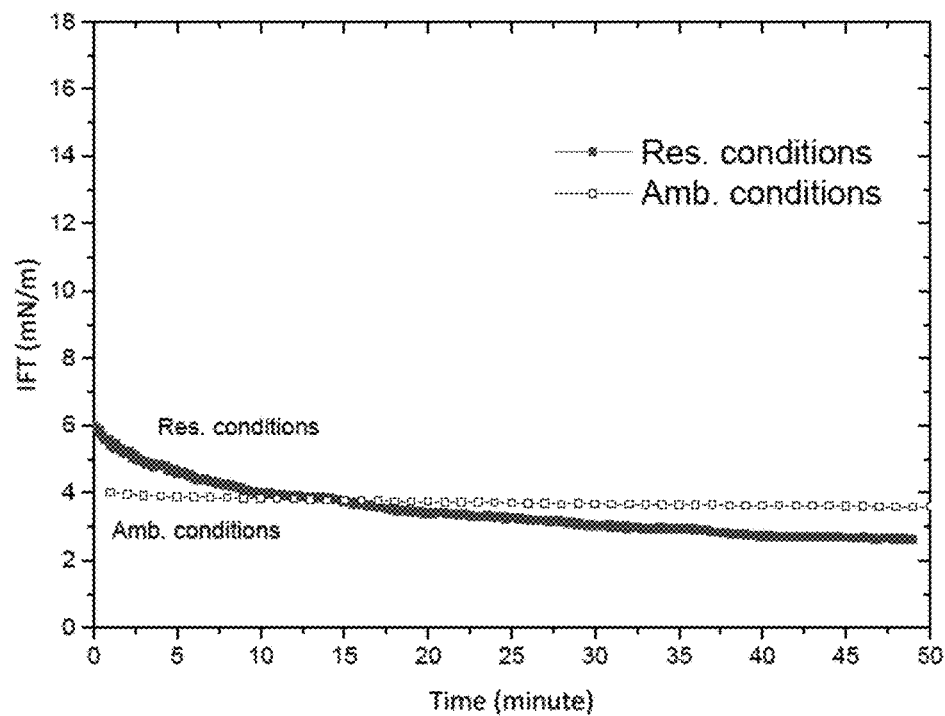
FIG. 6D. Effect of temperature on dynamic IFT of surfactant solution/crude oil at reservoir conditions (6840 psi and 120° C.), wherein the surfactant comprises a hydrophobic $CH_3(CH_2)_n$ chain with n=11-14 and a hydrophilic EO—18 chain (EO: number of ethylene oxides). In descending order of its starting point on the y-axis, the data corresponds to: reservoir conditions, ambient conditions.
Figure 6E:
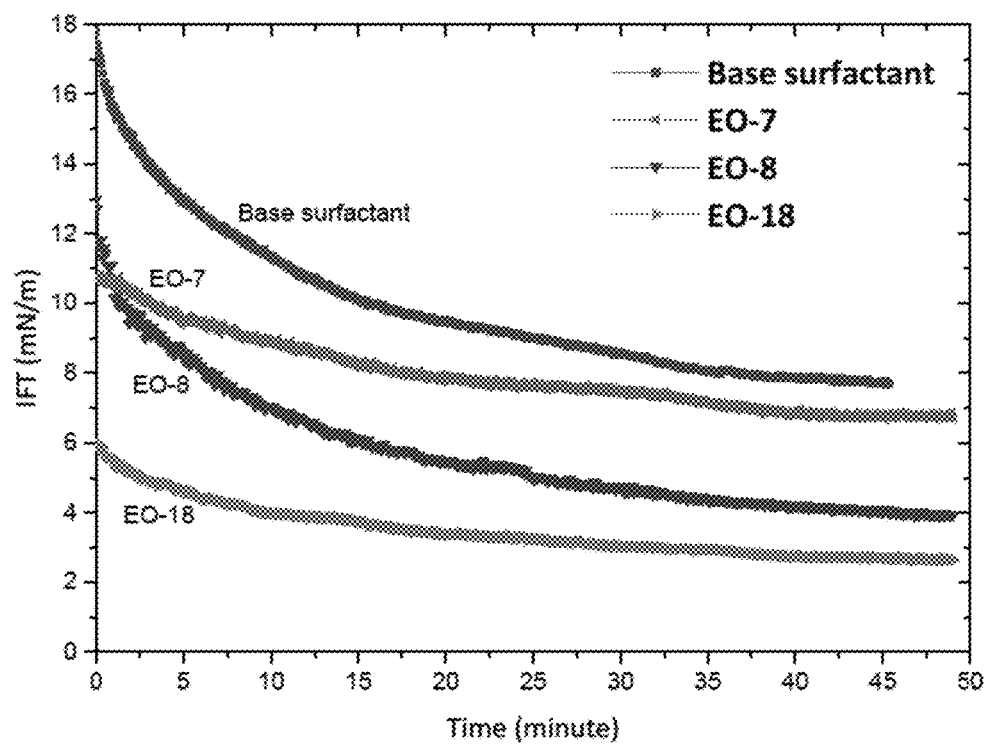
FIG. 6E. Effect of hydrophilic chain length (EO: number of ethylene oxides) on dynamic IFT of select surfactant solutions/crude oil at reservoir conditions (6840 psi and 120° C.). In descending order of its starting point on the y-axis, the data corresponds to: base surfactant, EO—8, EO—7, EO—18.

As shown in FIGS. 5A-5F, at ambient conditions, both the base surfactant and surfactants with shorter hydrophilic chains produced smaller IFTs than surfactants with large hydrophilic heads. However, IFT of surfactants with a large hydrophilic head remained unchanged at reservoir conditions, while the other surfactants' IFT increased (FIG. 6D). Thus, surfactants with the highest hydrophilicity had the lowest IFTs at reservoir conditions and were found to be more suitable for improved oil recovery applications.

Contact Angle

Contact angle tests were performed in accordance with the invention on the surfaces of Edwards limestone, Berea sandstone, and reservoir core samples.

Prior to dynamic contact angle measurements, reservoir rock samples were cut using a precision saw and polished to create a smooth surface and to remove irregular and uneven areas. The surface roughness of the reservoir rock samples was expected to be lower than 1 µm (V. Mirchi, S. Saraji, L. Goual, and M. Piri, Dynamic interfacial tension and wettability of shale in the presence of surfactants at reservoir conditions, Fuel, vol. 148, pp. 127-138, 2015). The rock substrate was then placed on a sample holder inside the measurement cell and the cell was filled with brine solution.

For dynamic contact angle measurements, images were captured while oil bubbles were slowly swelled or shrunk beneath the rock surface using a Quizix pump. For static contact angle measurements, limestone and sandstone rock samples were cut and then vacuum saturated with crude oil. The saturated samples were then immersed in brine solution.

After crude oil was produced from the sample by brine imbibition, static contact angles were captured with a CCD camera equipped with a suitable magnifying lens. The captured images of dynamic and static bubbles were analyzed using ImageJ software, and the contact angle was determined by measuring the angles made by the tangent line on the bubbles through the brine phase. A detailed procedure for contact angle determination is provided in V. Mirchi, S. Saraji, L. Goual, and M. Piri, Dynamic interfacial tension and wettability of shale in the presence of surfactants at reservoir conditions, Fuel, vol. 148, pp. 127-138, 2015, which is incorporated herein by reference in its entirety.

Figure 7A:
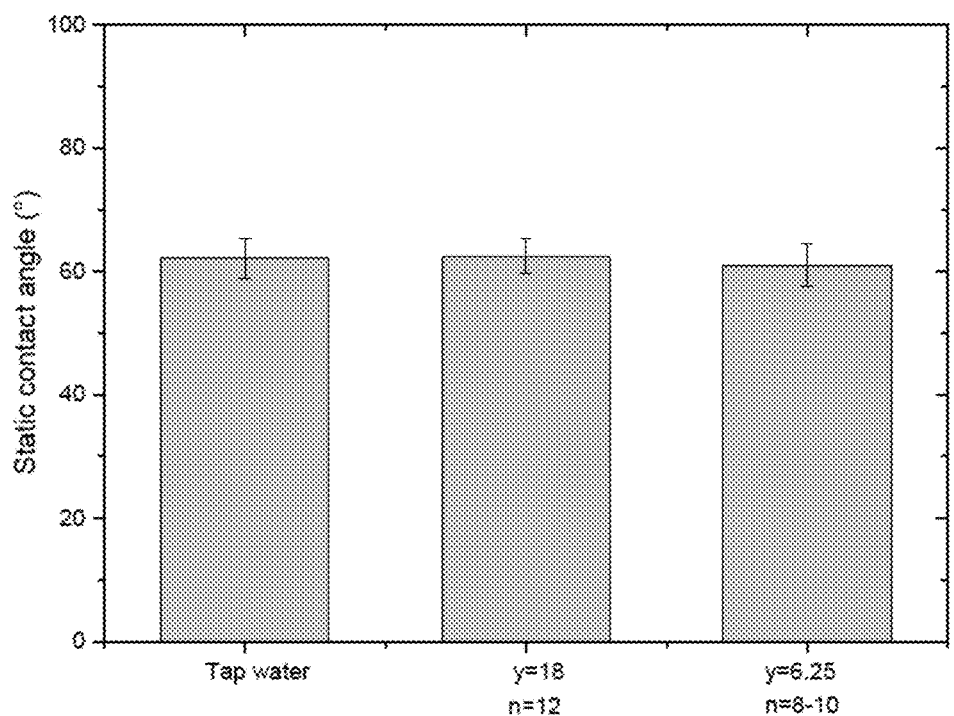
FIG. 7A. Effect of surfactant structure on static contact angle on Edwards limestone at ambient conditions with a $CH_3(CH_2)_n$—O—$(CH_2CH_2O)_y$H surfactant. Tap water was used for comparison.
Figure 7B:
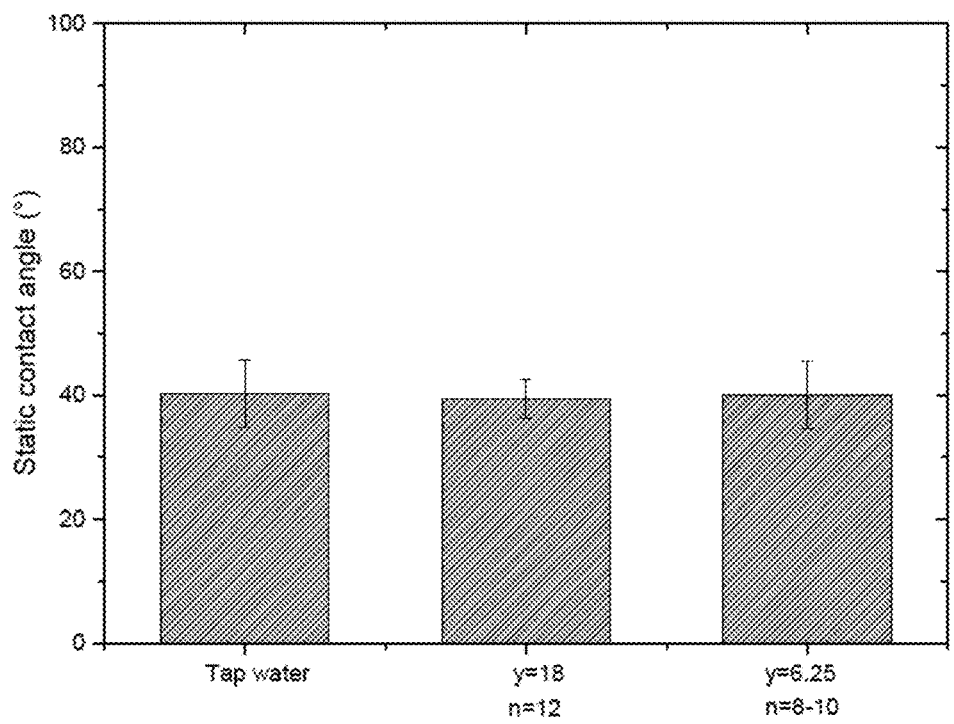
FIG. 7B. Effect of surfactant structure on static contact angle on Berea sandstone at ambient conditions with a $CH_3(CH_2)_n$—O—$(CH_2CH_2O)_y$H surfactant. Tap water was used for comparison.

Static contact angles of crude oil on limestone and sandstone samples immersed in different surfactant solutions (0.1 wt. %) were measured at ambient conditions and are shown in FIGS. 7A and 7B.

Figure 8A:
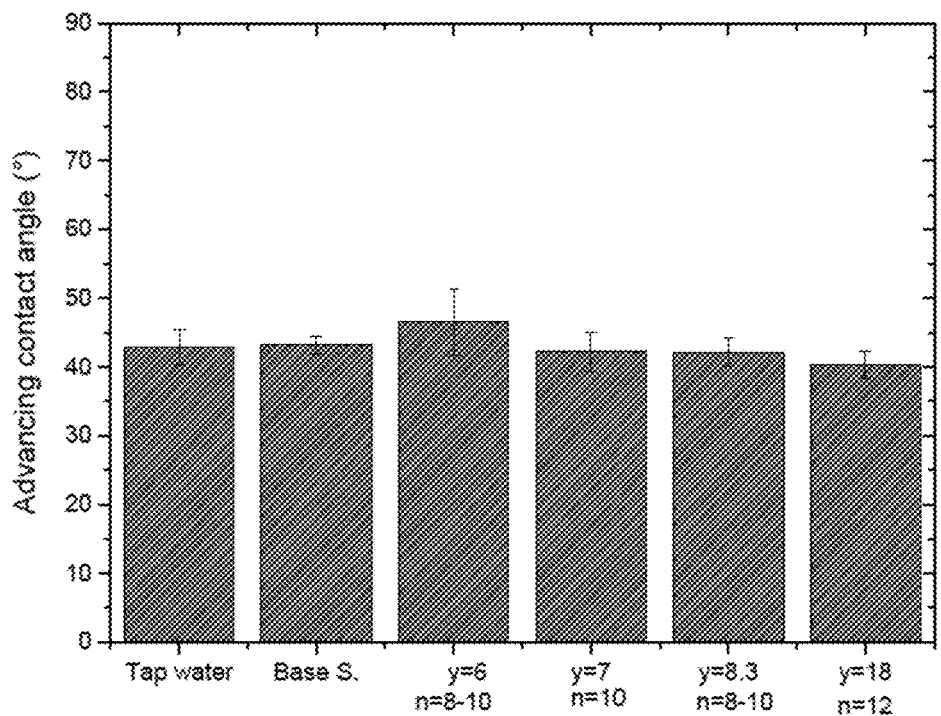
FIG. 8A. Effect of surfactant structure on advancing dynamic contact angle at reservoir conditions with a $CH_3(CH_2)_n$—O—$(CH_2CH_2O)_y$H surfactant. Tap water and base surfactant were used for comparison.
Figure 8B:
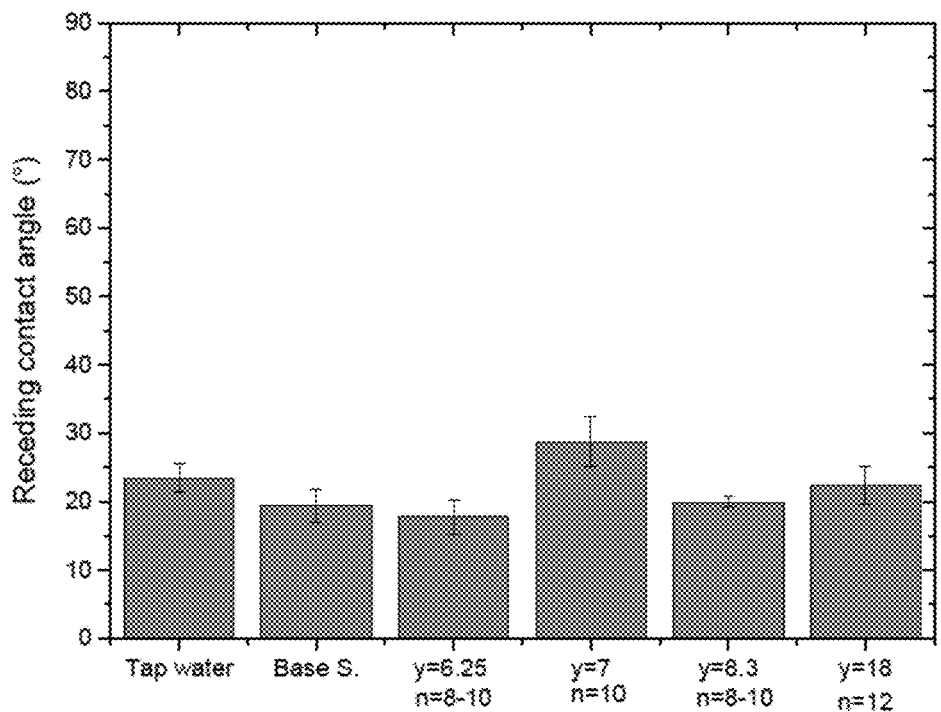
FIG. 8B. Effect of surfactant structure on receding dynamic contact angle at reservoir conditions with a $CH_3(CH_2)_n$—O—$(CH_2CH_2O)_y$H surfactant. Tap water and base surfactant were used for comparison.

Dynamic contact angle measurements were performed at reservoir conditions to investigate the effect of various surfactant structures on the wettability of reservoir rock surface. Contact angles of crude oil bubbles, which were growing and shrinking beneath the rock surface at a slow flow rate, were measured on prepared rock surfaces in the presence of surfactant solutions (captive bubble). The presented data for each surfactant in FIGS. 8A and 8B is the average value calculated from 30 measured contact angles, each obtained at a 5-second interval.

Lengthening the ethylene oxide side of nonionic surfactants was found to have no impact on the wettability state of Edwards limestone or Berea sandstone (FIGS. 7A and 7B). Similarly, the dolomitic siltstone rock surface of the reservoir rock sample exhibited a water-wet behavior with advancing (oil shrinking) and receding (oil expanding) contact angles of 43.19 and 23.19 degrees, respectively. The dynamic contact angle values in FIGS. 8A and 8B remained nearly unchanged with tap water and different surfactant structures. This suggests no sensitivity of reservoir rock's wettability to nonionic surfactants containing POE chains. Earlier comparison of anionic and nonionic surfactant adsorption on reservoir rock samples demonstrated that nonionic surfactant adsorption is smaller than anionic surfactant adsorption due to weaker electrostatic interactions with functional groups at the rock surface (V. Mirchi, S. Saraji, L. Goual, and M. Piri, Dynamic interfacial tension and wettability of shale in the presence of surfactants at reservoir conditions, Fuel, vol. 148, pp. 127-138, 2015).

Spontaneous Imbibition

Spontaneous imbibition tests were performed in accordance with the invention on cylindrical Edwards limestone, Berea sandstone, and reservoir core samples at ambient conditions. The Edwards limestone and Berea sandstone cores were initially vacuumed using a robust vacuum pump (TRIVAC Vane, ~$10^{-7}$ psi) for one day, and the reservoir core samples were initially vacuumed using a robust vacuum pump for three days. Thereafter, crude oil was gradually introduced to the cores inside the vacuum cell until the entire rock was immersed in crude oil, which resulted in 97-99% oil saturation for the Edwards limestone and Berea sandstone cores and in 70-80% for reservoir core samples.

The saturated cores were then placed in glass imbibition cells with a volume accuracy of 0.1 cc and filled with brine from the top. A thin V-shaped glass spacer beneath each saturated core ensured that all core faces were exposed to the brine solution. Produced oil volume was recorded as a function of time until no more production was observed. Oil production by spontaneous imbibition of brine solution was reported as a percentage of the original oil in place.

Forced Imbibition

Forced imbibition tests were performed in accordance with the invention.

Spontaneous imbibition is impacted by capillary forces in the porous medium (i.e., a rock sample) in the absence of any applied external forces. As imbibition takes place in a core sample saturated with crude oil, the wetting phase (i.e., water) saturation increases with a rate that depends on wettability, pore size distribution, IFT of fluids, and other factors. Each set of tests with Edwards limestone and Berea sandstone rocks was conducted with core samples of similar wetting state, permeability, and pore size distribution, while IFTs were varied using different surfactants.

The results of spontaneous imbibition tests in Edwards limestone and Berea sandstone rock samples with reservoir crude oil and different surfactant solutions (0.1 wt %) are shown in FIGS. 9A-9F. The results in each case are the average of 3-4 measurements with an error bar showing the variations.

Figure 10:
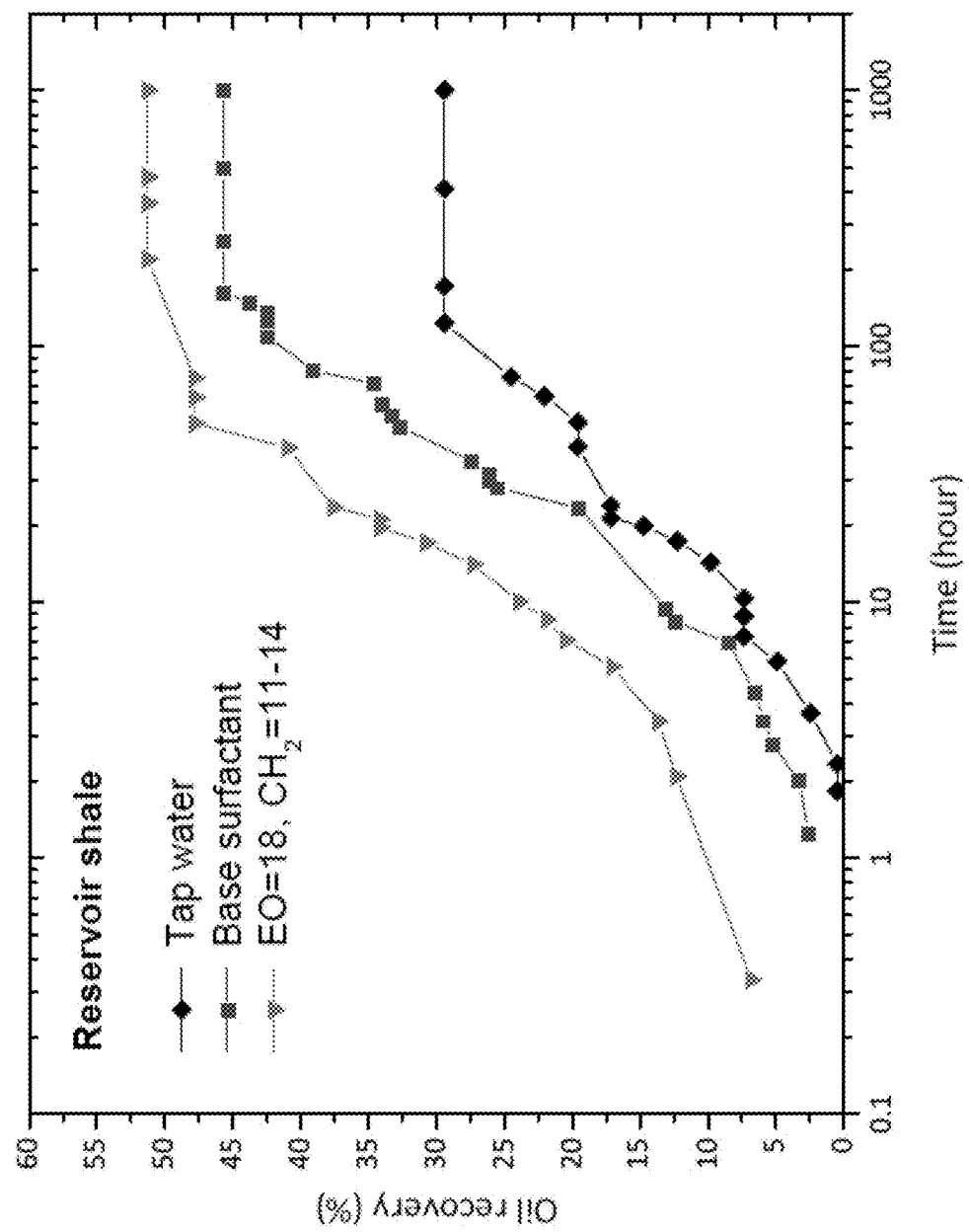
FIG. 10. Spontaneous imbibition in saturated reservoir core samples at ambient conditions using tap water, base surfactant, and a surfactant comprising an EO-18 hydrophilic chain and a hydrophobic $CH_3(CH_2)_n$ alkyl chain with n=11-14.

Imbibition tests on reservoir rock samples were performed with a surfactant comprising EO=18 and $CH_2$=11-14. The spontaneous imbibition results obtained with this surfactant were compared to those of the base surfactant and tap water (FIG. 10).

FIG. 2 shows a schematic diagram of the forced imbibition apparatus used in the forced imbibition tests. The forced imbibition apparatus comprises three Quizix pumps, two pumps for oil and water injection and one pump for back pressure regulation, two pressure transducers, a dome-loaded back pressure regulator, a manual over-burden pressure pump, a cooling bath, and a burette for fluid collection. The core assembly was mounted in an oven with temperature control to reach experimental conditions.

Edwards limestone core samples were used for flow tests. Edwards limestone blocks were cut to achieve core samples 3.7 cm in diameter and 15 cm long. The Edwards limestone core samples were then flushed with $CO_2$ and vacuumed to remove trapped gases.

Synthetic reservoir brine was injected into the Edwards limestone and Berea sandstone core samples with gradually increasing flow rate at both ambient and reservoir conditions. Absolute brine permeability was quantified by measuring the pressure differential across the core samples. Average porosity was determined using the total volume of the core samples and the weight difference of the core samples before and after saturation with brine. After the core samples were saturated with reservoir brine at reservoir conditions, each core sample was subjected to primary drainage, imbibition, and secondary drainage tests. To mitigate the effect of potential gravity segregation, brine was injected from the bottom of the core holder.

Initial water saturation ($S_{wi}$) was established by oil injection (primary drainage) at reservoir conditions and was determined to be about 23% for the core samples. Different surfactant solutions were injected at a constant flow rate of 0.1 cc/min (imbibition). This flow rate provided a capillary-dominated displacement regime with an average capillary number of $1.355 \times 10^{-6}$ for all the IFT values used in this study. The capillary numbers were calculated using Equation 2.

$$N_c = \frac{\mu_b u_b}{\sigma_{ob} \phi} \quad (2)$$

Variables $\mu_b$, $u_b$, $\emptyset$ and $\sigma_{ob}$ respectively represent viscosity, Darcy velocity of brine, sample porosity, and the interfacial tension between oil and brine. Residual oil saturation ($S_{or}$) was determined at the end of the imbibition stage by calculating the volume difference before and after imbibition and the weight difference of the core samples before and after imbibition.

The last stage of flooding tests included oil injection (secondary drainage) at reservoir conditions in order to simulate the flowback process after hydraulic fracturing and to assess the influence of different surfactant structures on remaining water saturation ($S_{wr}$). The outlet and confining pressures of the core samples were maintained at 6840 psi and 8100 psi, respectively throughout secondary drainage.

Three sets of flooding tests (i.e., three sets of tests comprising the primary drainage, imbibition, and secondary drainage steps) were performed on three low-permeability Edwards limestone core samples at reservoir conditions. These Edwards limestone samples were cut from the same block, which was acquired from a quarry in Texas. The physical properties and dimensions of the rock samples are listed in Table 2. Table 6 summarizes the results of the forced imbibition tests, which include endpoint-relative permeability values, final fluid saturations, and recovery factor percentages for all three steps of the flooding tests. All the forced imbibition tests were performed at a brine flow rate of 0.1 cc/min, providing an average capillary number of $1.355 \times 10^{-6}$.

TABLE 6

Fluid saturations, end-point relative permeability, and recovery factors obtained at the end of each step of forced imbibition at reservoir conditions.

| | Base surfactant | | | | EO-18 (1st test) | | | | EO-18 (2nd test) | | | |
|---|---|---|---|---|---|---|---|---|---|---|---|---|
| | $S_w$ | $k_{rw}$ | $k_{ro}$ | RF (%) | $S_w$ | $k_{rw}$ | $k_{ro}$ | RF (%) | $S_w$ | $k_{rw}$ | $k_{ro}$ | RF (%) |
| 1st Drainage | 0.233 | — | 0.5 | — | 0.234 | — | 0.41 | — | 0.238 | — | 0.45 | — |
| Imbibition | 0.601 | 0.084 | — | 47.98 | 0.654 | 0.12 | — | 54.83 | 0.643 | 0.065 | — | 53.15 |
| 2nd Drainage | 0.231 | — | 0.29 | 61.56 | 0.279 | — | 0.31 | 57.83 | 0.270 | — | 0.24 | 58.01 |

Figure 9A:
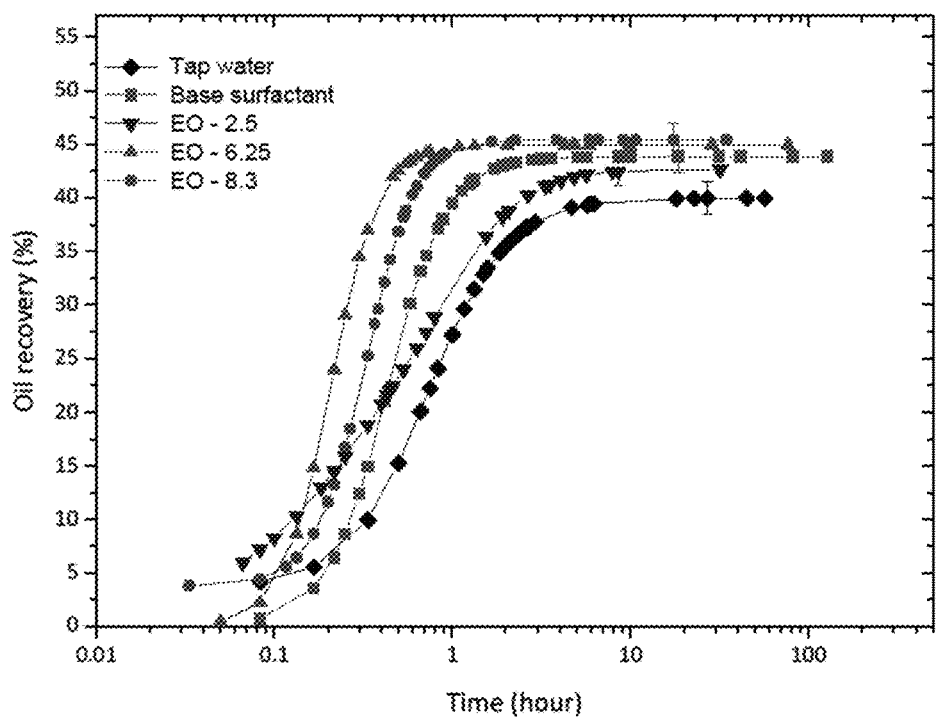
FIG. 9A. Effect of changes in the hydrophilic chain length of surfactant molecules on spontaneous imbibition of surfactant solutions in saturated Edwards limestone rock samples at ambient conditions. All surfactant molecules tested had a hydrophobic $CH_3(CH_2)_n$ alkyl chain wherein n=8-10.
Figure 9B:
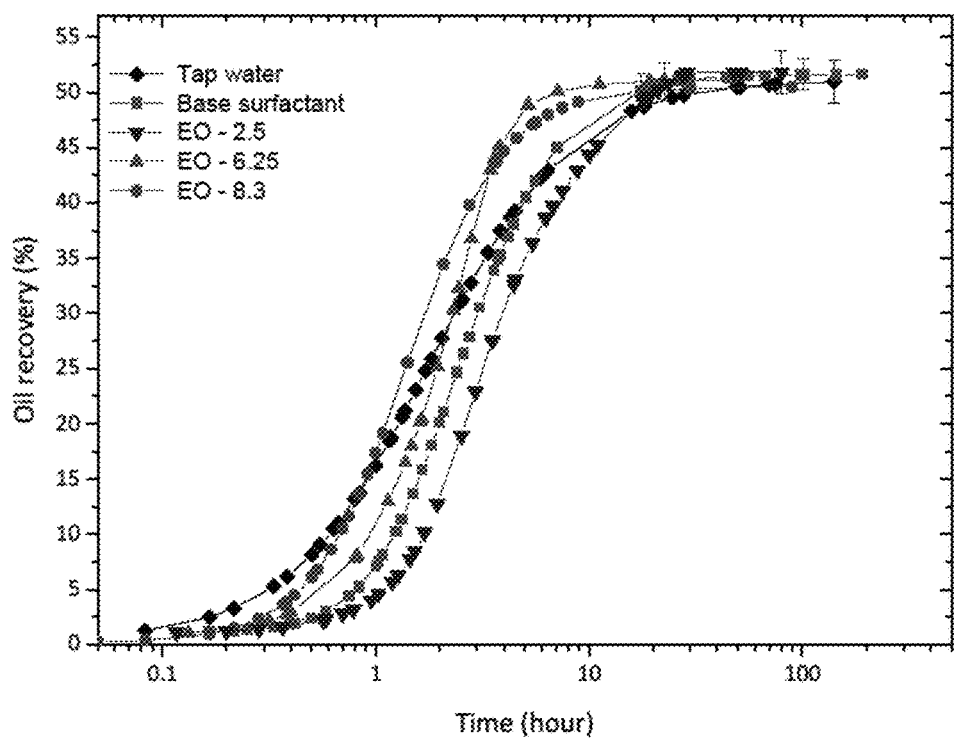
FIG. 9B. Effect of changes in the hydrophilic chain length of surfactant molecules on spontaneous imbibition of surfactant solutions in saturated Berea sandstone rock samples at ambient conditions. All surfactant molecules tested had a hydrophobic $CH_3(CH_2)_n$ alkyl chain wherein n=8-10.
Figure 9C:
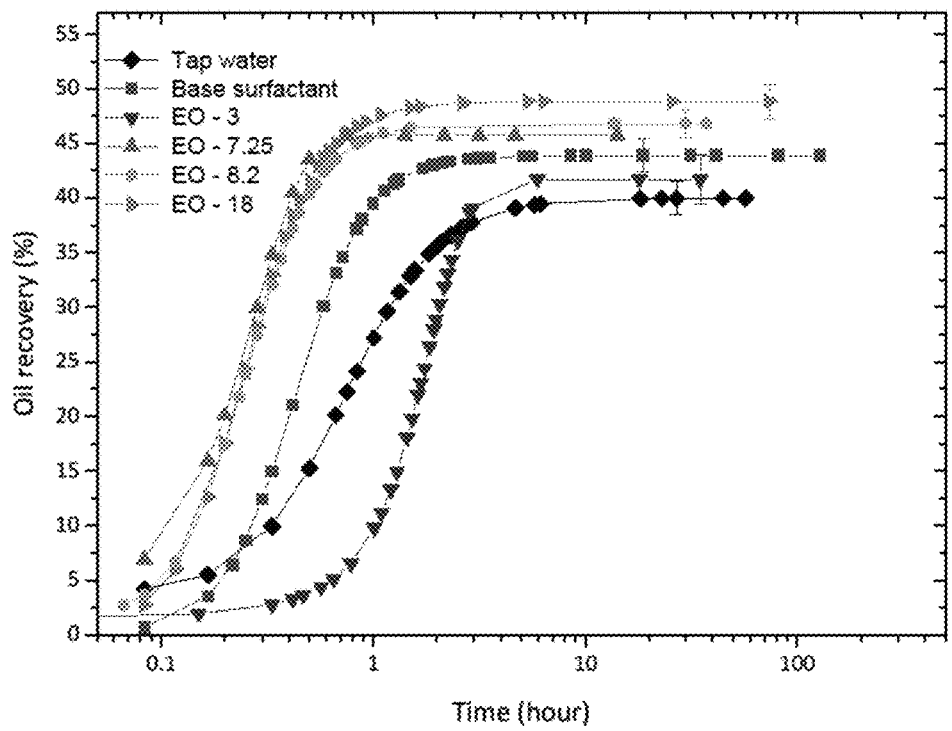
FIG. 9C. Effect of changes in the hydrophilic chain length of surfactant molecules on spontaneous imbibition of surfactant solutions in saturated Edwards limestone rock samples at ambient conditions. All surfactant molecules tested had a hydrophobic $CH_3(CH_2)_n$ alkyl chain wherein n=11-14.
Figure 9D:
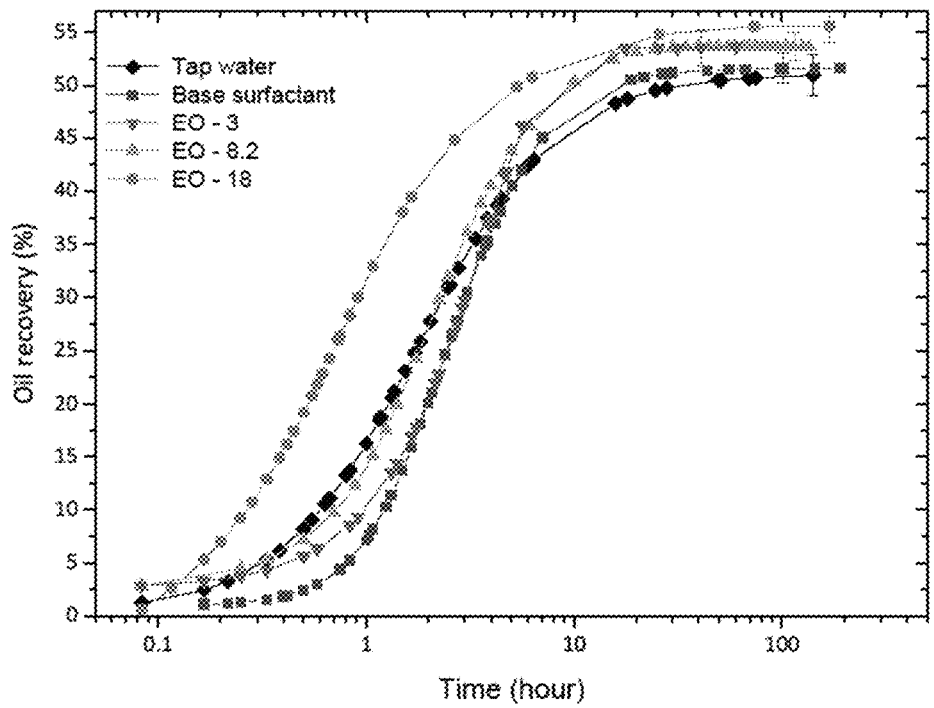
FIG. 9D. Effect of changes in the hydrophilic chain length of surfactant molecules on spontaneous imbibition of surfactant solutions in saturated Berea sandstone rock samples at ambient conditions. All surfactant molecules tested had a hydrophobic $CH_3(CH_2)_n$ alkyl chain wherein n=11-14.

The effect of hydrophilic/hydrophobic chain length of nonionic surfactants on oil recovery from Edwards limestone core samples was studied through spontaneous imbibition tests. Surfactants with short hydrophilic chains (e.g., surfactants with EO of 3) resulted in only a slight improvement in final oil production compared to tap water and resulted in no improvement in final oil production compared to the base surfactant in limestone samples (FIG. 9A). Surfactants with EO of 6.25 and 8.3 produced a higher amount of oil than the base surfactant and surfactants with short hydrophilic chains (e.g., surfactants with EO of 3). Similar results were observed for surfactants with alkyl chain of 11-14 (FIG. 9C).

Analogous behavior was observed during imbibition tests in Berea sandstone samples. FIG. 9B shows that brine imbibition in the presence of surfactants with short hydrophilic chains (e.g., surfactants with EO 2.5) is slower than brine imbibition in the presence of either municipal water or base surfactant, which may be a result of surfactant precipitation and partial pore- and throat-blockage.

As shown in FIGS. 7A, 7B, 8A, and 8B, the impact of POE surfactant structure on contact angle results is small. Thus, a high surface activity may explain the strong imbibition induced by lengthening the hydrophilic chain of surfactants.

Lower equilibrium IFT was observed to result in higher oil recovery, suggesting that oil production correlated inversely to equilibrium IFT values. Although IFT reduction rates of surfactants with low to medium hydrophilic chains (EO=3-8.2) were similar, equilibrium IFTs for these surfactants were different. Thus, equilibrium IFT for surfactants with low to medium hydrophilic chain may explain the improvement in oil production observed upon increasing EO chain length in surfactants from low to medium.

In tests that lengthened the hydrophilic side chain from medium to high (EO 8.2-18) in a surfactant series with the same hydrophobic chain, surfactants with longer hydrophilic chains (e.g., EO 18) provided higher oil production from Edwards limestone samples than surfactants with shorter hydrophilic chains (e.g., EO 8.2) (FIG. 9C). In contrast to tests that lengthened the hydrophilic side chain from low to medium, tests that lengthened the hydrophilic side chain from medium to high exhibited a correlation between superior production, higher IFT values, and faster IFT equilibration.

Table 7 shows the relationship between recovery values and lengthening surfactants' hydrophilic chain. As shown in the table, an increase in ethoxylation degree reduced the time required for IFTs to reach half of their value and sped up oil production. Thus, greater oil production from Edwards limestone was observed when IFT reduction regions (including induction, rapid fall, and mesoequilibrium) are close to each other, creating a flat line for dynamic IFT values (FIGS. 5A-5F). Although lengthening surfactants' hydrophilic side chain from medium to high (EO 8.2-18) sped up brine imbibition in Berea sandstone samples (FIG. 9D), it did not significantly affected final oil production.

Figure 9E:
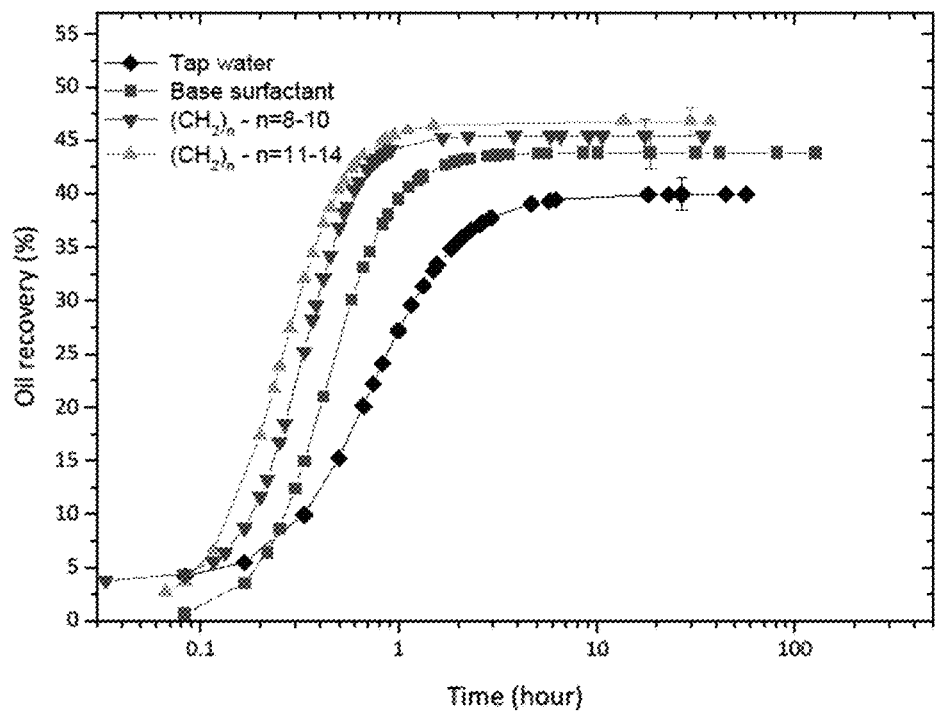
FIG. 9E. Effect of changes in the hydrophobic chain length of surfactant molecules on spontaneous imbibition of surfactant solutions in saturated Edwards limestone rock samples at ambient conditions. All surfactant molecules tested had an EO—8.3 hydrophilic chain (EO: number of ethylene oxides).
Figure 9F:
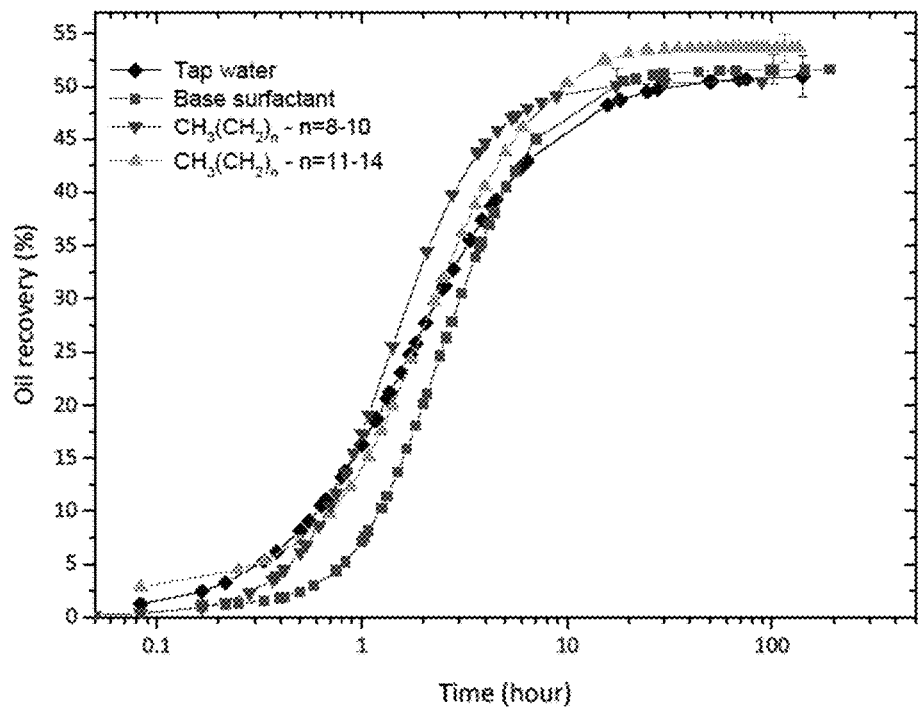
FIG. 9F. Effect of changes in the hydrophobic chain length of surfactant molecules on spontaneous imbibition of surfactant solutions in saturated Berea sandstone rock samples at ambient conditions. All surfactant molecules tested had an EO—8.3 hydrophilic chain (EO: number of ethylene oxides).

FIGS. 9E, 9F, and Table 7 demonstrate an enhancement in oil production by increasing the number of methylene groups from 8-10 to 11-14. The improvement in oil recovery accorded with the corresponding IFT values. An increase in surfactants' lipophilic characteristics may induce a minor increase in the surfactants' surface activity.

Impact of Rock Type on Oil Recovery.

The Edwards limestone and Berea sandstone samples have different mineralogies and pore structures. Based on the pore size distribution analysis shown in FIG. 1C, Edwards limestone has a wider pore size distribution (approx. 1-400 μm) than that of Berea sandstone (approx. 1-300 μm). Edwards limestone also includes two distribution spikes (i.e., bimodal distribution), one spike on a small pore size range (i.e., <5 μm) and the other spike on a larger range (i.e., ≥250 μm). SEM images confirm the existence of micro pores in this rock (FIG. 1D). Although the Edwards core samples had lower permeability than the Berea sandstone samples, the presence of micro pores in the Edwards core samples may have improved oil production rates at initial stages. Micro pores may have provided better brine imbibition accessibility to small oil-filled pores at initial imbibition stages.

Pore size distribution impacts the relationship between the capillary desaturation curve (CDC) and residual non-wetting saturations (M. Khishvand, M. Akbarabadi, and M. Piri, Micro-scale experimental investigation of the effect of flow rate on trapping in sandstone and carbonate rock samples, Advances in Water Resources, vol. 94, pp. 379-399, 2016; L. W. Lake, Enhanced oil recovery, Prentice Hall, 1989). The inflection point in CDC for carbonates (e.g., limestones), which have a wider pore size distribution, happens at lower capillary numbers than the inflection point in CDC for sandstones (L. W. Lake, Enhanced oil recovery, Prentice Hall, 1989). Therefore, increasing the capillary number by reducing IFT in Edwards limestone has a greater impact on the residual oil saturation compared to that of Berea sandstones. As such, using surfactant solutions led to oil recovery from Berea sandstone similar to those of tap water with no surfactant. However, narrower pore size distribution, smaller pore-to-throat aspect ratio, and lower contact angles (FIGS. 7A and 7B) in Berea sandstone led to greater oil production than in Edwards limestone (51% oil recovery compared to 45%) (M. Khishvand, M. Akbarabadi, and M. Piri, Micro-scale experimental investigation of the effect of flow rate on trapping in sandstone and carbonate rock samples, Advances in Water Resources, vol. 94, pp. 379-399, 2016; Y. Tanino and M. J. Blunt, Capillary trapping in sandstones and carbonates: Dependence on pore structure, Water Resources Research, vol. 48, 2012; G. R. Jerauld, and S. J. Salter, The effect of pore-structure on hysteresis in relative permeability and capillary pressure: Pore-level modeling, Transport in Porous Media, vol. 5, pp. 103-151, 1990).

The presence of different minerals in the Edwards limestone and Berea sandstone samples did not affect the interfacial properties of nonionic surfactant solutions and crude oil. For Edwards limestone samples, equilibrated tap water and unequilibrated tap water provided similar dynamic IFT values with crude oil (i.e., 18.88±0.68 mN/m). In addition, nonionic surfactants have only minor interactions with different minerals. Thus, rock sample pore structure was determined to influence surfactant solution/oil displacements more than rock sample mineralogy.

In ultra-tight rocks, capillary force impacts fluid displacements. As such, the impact of gravity segregation on conventional rocks must be determined. When the bond number (the ratio of buoyancy to capillary forces) is low (e.g., $\leq 10^{-6}$) fluid flow is capillary controlled (D. S. Schechter, Z. Denqen, F. M. Orr, Capillary imbibition and gravity segregation in low IFT systems, SPE Annual Technical Conference and Exhibition, October, Dallas, Tex., 1991). Bond number can be calculated from Equation 3 (N. R. Morrow, and B. Songkran, Effect of viscous and buoyancy forces on non-wetting phase trapping in porous media, Surface Phenomena in Enhanced Oil Recovery, edited by D. O. Shah, pp. 387-411, Plenum, N.Y., 1981).

$$B_o = \frac{\Delta_{\rho} g K}{\gamma} \quad (3)$$

In Equation 3, K is intrinsic (absolute) permeability of the porous medium, $\gamma$ is interfacial tension, $\Delta_\rho$ is density difference and g is acceleration due to gravity, respectively.

For the lowest IFT determined, the calculated bond number was $1.31 \times 10^{-8}$. For the highest IFT determined, the calculated bond number was $7.3 \times 10^{-10}$. The calculated bond numbers for the lowest and highest IFTs indicate that fluid flow is under a capillary-dominated regime. Gravity segregation was not responsible for oil production, as oil was produced from all sides of the core samples and not just from the top.

Moreover, the unconventional reservoir core samples have a pore size distribution similar to the Edwards limestone core samples: one small pore diameter peak and one large pore diameter peak (M. Akbarabadi, S. Saraji, and M. Piri, Nano-scale experimental investigation of in-situ wettability and spontaneous imbibition in ultra-tight Reservoir Rocks, 2016, To be submitted). In tight rocks, the presence of poorly connected nanopores and micro fractures slows down the brine imbibition into the porous media, which creates differences in the rate and final production of oil with various surfactants. As seen in FIG. 10, the selected surfactant provided a faster and higher production from reservoir core sample than the base surfactant or tap water. Oil recovery from reservoir rock sample with surfactants increased by up to 6% compared to that of base surfactant and by up to 22% compared to that of tap water without surfactant. As such, the method of the invention proposed can be applied on to screen surfactants for hydraulic fracturing process in tight samples.

Based on the mineralogy of the reservoir rock sample, pore size distribution results, and spontaneous imbibition trends, Edwards limestone was selected for additional tests at reservoir conditions. In forced imbibition tests at reservoir conditions (Table 6), oil production due to imbibition increased by 5-6% using EO-18 surfactant compared to the base surfactant. The increase in oil recovery with EO-18 may be attributed to an instantaneous reduction in IFT and a subsequent rapid decrease in the threshold capillary pressure in the pore space at a fixed brine flow rate (0.1 cc/min). During flowback tests on the reservoir rock sample at reservoir conditions, brine volumes recovered by EO-18 were comparable to those recovered by base surfactant.

Table 6 also lists the end-point relative permeability data. The end-point water relative permeability increased as residual oil saturation was reduced from the first waterflooding test (base surfactant) to the second waterflooding test (EO-18). However, $k_{rw}$ decreased in the third waterflooding test. The variation in end-point relative permeability values in the third waterflooding test may have been caused by differences in the samples used.

For all the forced imbibition tests, $k_{ro}$ values at the end of the second drainages are lower than $k_{ro}$ values of the first drainages, despite the similar initial water saturations for both drainages. The differences in $k_{ro}$ values at the end of the drainages may be caused by trapping of the non-wetting phase in pores and throats during imbibition process prior to the second drainage.

A new systematic and integrated procedure was introduced to study the influence of surfactant structures on interfacial properties and oil recovery of oil/brine/rock systems using conventional and unconventional rocks. Hydrophobic and hydrophilic parts of POE-type nonionic surfactants were altered, while solubilization, emulsification, and dynamic IFT were investigated at both ambient and reservoir conditions. Spontaneous imbibition tests were also conducted in relatively low permeability limestone and sandstone rocks to study the impact of mineralogy and pore structure on oil recovery. The performances of these surfactants were compared to that of a base surfactant commercially deployed in the targeted unconventional reservoir.

Surfactants with greater degree of hydrophilicity were more appropriate at reservoir conditions because their structures tolerate higher temperatures. Although EO chain elongation increased the surfactants' emulsification propensity at ambient conditions, no microemulsions were observed at high temperature using reservoir crude oil and tap water.

Surfactants that reduced the IFT rapidly were more effective than surfactants that reduced the IFT to lower values but over a longer period of time. For example, although the highly ethoxylated POE-type surfactant did not provide the lowest IFT, this surfactant rapidly reached equilibrium upon introduction of crude oil to the surfactant solutions and resulted in the significantly improved oil recovery.

Increasing the hydrophilicity of surfactants from low to high range resulted in higher oil recovery during spontaneous imbibition tests. Surfactant increased the oil production from reservoir rock sample by up to 22% compared to tap water and by up to 6% compared to the base surfactant.

Spontaneous imbibition behavior of oil/brine in rock samples using different nonionic surfactants was affected more significantly by pore-throat structure than mineral type. Applying various nonionic surfactant structures did not affect the original wettability state of reservoir rock at reservoir conditions.

The proposed methodology for surfactant evaluation was verified through forced imbibition tests at reservoir conditions. The optimum surfactant structure improved oil recovery by 5-6% compared to the base surfactant.

The invention claimed is:

1. A method for determining an optimal surfactant structure for oil recovery, comprising the steps of:
   (a) evaluating a surfactant's phase behavior;
   (b) evaluating the surfactant's solubility;
   (c) evaluating the surfactant's dynamic interfacial tension, wherein the surfactant's dynamic interfacial tension is evaluated by:
      (c-1) creating a bubble of crude oil inside a measurement cell,
      (c-2) capturing oil bubble images, and
      (c-3) fitting drop profiles to the Young-Laplace equation;
   (d) evaluating the surfactant's static and dynamic contact angles on a porous rock sample;
   (e) evaluating the surfactant's spontaneous imbibition in the porous rock sample; and
   (f) evaluating the surfactant's forced imbibition in the porous rock sample.

2. The method as in claim 1, wherein the method is carried out with a surfactant concentration above a critical micelle concentration.

3. The method as in claim 1, wherein the surfactant's phase behavior is evaluated by visualizing a microemulsion middle phase at ambient and high temperatures.

4. The method as in claim 1, wherein the surfactant's solubility is evaluated by determining the surfactant's cloud point temperature from ambient conditions to reservoir conditions.

5. The method as in claim 1, wherein the surfactant's dynamic interfacial tension is evaluated at ambient conditions and at reservoir conditions.

6. The method as in claim 1, wherein oil bubble images are captured at time intervals ranging from 1 second to 100 seconds.

7. The method as in claim 1, wherein the surfactant's static and dynamic contact angles are evaluated at ambient conditions and at reservoir conditions.

8. The method as in claim 1, wherein the surfactant's static contact angle is evaluated by (d-1) vacuum saturating a porous rock sample with crude oil; (d-2) immersing the saturated porous rock sample in a brine solution; (d-3) capturing oil bubble images as they were produced; and (d-4) measuring angles made by a tangent line on the oil bubble images through the brine solution.

9. The method as in claim 1, wherein the surfactant's dynamic contact angle is evaluated by (d-5) creating bubbles of crude oil inside a measurement cell; (d-6) capturing oil bubble images as oil bubbles were injected or retracted beneath a porous rock sample surface; and (d-7) measuring angles made by a tangent line on the oil bubble images through a brine solution using imaging software.

10. The method as in claim 1, wherein the surfactant's spontaneous imbibition is evaluated at ambient conditions.

11. The method as in claim 10, wherein the surfactant's spontaneous imbibition is further evaluated by (e-1) saturating a porous rock sample in crude oil; (e-2) exposing the saturated porous rock sample to a brine solution; and (e-3) measuring oil production resulting from brine imbibition.

12. The method as in claim 1, wherein the surfactant's forced imbibition is evaluated by (f-1) saturating a porous rock sample with a brine solution; (f-2) subjecting the porous rock sample to primary drainage; (f-3) subjecting the porous rock sample to imbibition; and (f-4) subjecting the porous rock sample to secondary drainage.

13. The method as in claim 12, further comprising the step of (f-1-1) determining brine permeability and average porosity after step (f-1).

14. The method as in claim 12, wherein step (f-2) comprises injecting oil into the porous rock sample.

15. The method as in claim 12, further comprising the step of (f-2-1) determining initial water saturation after step (f-2).

16. The method as in claim 12, wherein step (f-3) comprises injecting a surfactant solution at a constant flow rate.

17. The method as in claim 16, wherein the flow rate of surfactant solution injection in the imbibition step is in a range from 0.001 cc/min to 5 cc/min.

18. The method as in claim 12, further comprising the step of (f-3-1) determining residual oil saturation after step (f-3).

19. The method as in claim 12, wherein step (f-4) comprises injecting oil into the porous rock sample after step (f-3).

* * * * *